(12) United States Patent
Baron et al.

(10) Patent No.: US 11,748,670 B2
(45) Date of Patent: Sep. 5, 2023

(54) DEVICE, SYSTEM AND METHOD FOR ALTERING A MEMORY USING RULE SIGNATURES AND CONNECTED COMPONENTS FOR DEDUPLICATION

(71) Applicant: AMADEUS S.A.S., Sophia Antipolis (FR)

(72) Inventors: Julien Baron, Biot (FR); Christophe Vallet, Biot (FR); Ilias Driouich, Biot (FR); Priyesh Chhabra, Biot (FR); Thierry Alexandre Spetebroot, Biot (FR)

(73) Assignee: AMADEUS S.A.S., Biot (FR)

(*) Notice: Subject to any disclaimer, the term of this patent is extended or adjusted under 35 U.S.C. 154(b) by 632 days.

(21) Appl. No.: 16/839,351

(22) Filed: Apr. 3, 2020

(65) Prior Publication Data

US 2021/0312337 A1 Oct. 7, 2021

(51) Int. Cl.
  *G06Q 10/02* (2012.01)
  *G06F 16/215* (2019.01)
  *G06Q 50/14* (2012.01)

(52) U.S. Cl.
  CPC .......... *G06Q 10/02* (2013.01); *G06F 16/215* (2019.01); *G06Q 50/14* (2013.01)

(58) Field of Classification Search
  CPC ....... G06Q 10/02–10/025; G06Q 50/12–50/14
  See application file for complete search history.

(56) References Cited

U.S. PATENT DOCUMENTS 10,489,462 B1 * 11/2019 Rogynskyy ....... G06F 16/24558
2009/0006398 A1 * 1/2009 Lam ..................... G06Q 30/02
(Continued)

FOREIGN PATENT DOCUMENTS

EP          2709045 A1   3/2014
WO   WO-2018134426 A1   7/2018
WO   PCT/EP2021/056942  3/2021

OTHER PUBLICATIONS

Hammerton, et al., On generating large-scale ground truth datasets for the deduplication of bibliographic records, WIMS '12, Jun. 15, 2012, Craiova, Romania (Year: 2012).*
(Continued)

*Primary Examiner* — Daniel Vetter
(74) *Attorney, Agent, or Firm* — PERRY + CURRIER, INC.

(57) ABSTRACT

A device, system and method for altering a memory using rule signatures and connected components for deduplication is provided. A server accesses a memory storing guest records identified by respective identifiers. The server generates, using one or more matching rules and the guest rules, a plurality of rule signatures associated with respective identifiers of a guest record from which a rule signature was generated. A rule signature comprises a string of values from a guest record substituted for corresponding information defined by a matching rule. A graph is generated comprising connected components of the rule signatures and respective identifiers, a connected component corresponding to a distinct guest of the guest records. An assigned identifier identifies a connected component. The server alters the memory to add the assigned identifiers to the guest records identified by respective identifiers associated with respective rule signatures of the connected components.

20 Claims, 25 Drawing Sheets

(56) References Cited

U.S. PATENT DOCUMENTS

| | | | |
|---|---|---|---|
| 2015/0227588 A1 | 8/2015 | Shapira et al. | |
| 2015/0294234 A1* | 10/2015 | Alberola | G06Q 10/02 705/5 |
| 2017/0371952 A1* | 12/2017 | Nelamangala | G06F 16/9024 |
| 2019/0079967 A1* | 3/2019 | Roukas | G06F 16/2365 |
| 2020/0081997 A1* | 3/2020 | Rashidi | G06Q 10/02 |
| 2020/0097508 A1* | 3/2020 | Lovelace | G06Q 20/0655 |
| 2020/0169565 A1* | 5/2020 | Badawy | G06F 21/577 |

OTHER PUBLICATIONS

Fatemi, et al., Record Linkage to Match Customer Names: A Probabilistic Approach, arXiv preprint arXiv:1806.10928, 2018 (Year: 2018).*

Christen, Development and User Experiences of an Open Source Data Cleaning, Deduplication and Record Linkage System, SIGKDD Explorations, vol. 11, No. 1, 2011, pp. 39-48 (Year: 2011).*

Christen, A Survey of Indexing Techniques for Scalable Record Linkage and Deduplication, IEEE Transactions on Knowledge and Data Engineering, vol. 24, No. 9, Sep. 2012, pp. 1537-1555 (Year: 2012).*

Özsu, Data Cleaning a Practical Perspective, Morgan & Claypool, 2013 (Year: 2013).*

Christen, et al., Towards Automated Data Linkage and Deduplication, Computer, vol. 16, No. 17, 2019 (Year: 2019).*

Helander, D., "Solving the Hotel Data Management Problem in 3 Steps", Blog post, Revinate.com, Dec. 12, 2016, URL: https://www.revinate.com/es/blog/solving-hotel-data-management-problem-3-steps/.

Demby, Z., "The Guest Data Platform Built for Hoteliers", Blog post, Revinate.com, Jan. 22, 2020, URL: https://www.revinate.com/blog/the-guest-data-platform-built-for-hoteliers/.

Heyneker, M., "Announcing the Guest Data Platform", Video blog, Revinate.com, Jan. 20, 2020, URL: https://www.revinate.com/videos/announcing-the-guest-data-platform/.

Ensemble IQ, "Revinate Launches Guest Data Platform", hospitalitytech.com, Jan. 23, 2020, URL: https://hospitalitytech.com/revinate-launches-guest-data-platform.

Oracle, "Profile Matching OXI", oracle.com, Sep. 3, 2010, URL: https://docs.oracle.com/cd/E98457_01/opera_5_6_core_help/profile_matching_oxi.htm.

dedupe.io LLC, "Dedupe—How it works", dedupe.io, Aug. 16, 2016, URL: https://dedupe.io/documentation/how-it-works.html.

Hotelappz, "Find Out More", www.hotelappz.com, Apr. 27, 2018, URL: https://www.hotelappz.com/find-out-more/.

Room Key PMS, "Profile Match & Merge", roomkeypms.com, Oct. 11, 2017, URL: https://roomkeypms.com/products/features/artificial-intelligence-guest-profile-matching-merging/.

\* cited by examiner

103

401  104

| Identifier | NAME | LoyID | Email |
|---|---|---|---|
| 1 | Alice | Loy1 | Smiths@1.com |
| 2 | Bob | Loy1 | Smiths@1.com |
| 3 | Alice | Loy1 | Alice@2.com |
| 4 | Charlie | NULL | Charlie@3.com |
| 5 | David | NULL | NULL |

Graph= (Edges, Vertices)

Edges

| Source | Destination | |
|---|---|---|
| 1 | Alice,Smiths@1.com | AID1 |
| 1 | Alice,Loy1 | AID1 |
| 3 | Alice,Loy1 | AID1 |
| 3 | Alice,Alice@2.com | AID1 |
| 2 | Bob,Smiths@1.com | AID2 |
| 2 | Bob,Loy1 | AID2 |
| 4 | Charlie,Charlie@3.com | AID3 |

Vertices

| | |
|---|---|
| 1 | AID1 |
| 2 | AID2 |
| 3 | AID1 |
| 4 | AID3 |
| 5 | AID4 |
| Alice,Smiths@1.com | AID1 |
| Alice,Loy1 | AID1 |
| Alice,Alice@2.com | AID1 |
| Bob,Smiths@1.com | AID2 |
| Bob,Loy1 | AID2 |
| Charlie,Charlie@3.com | AID3 |

FIG. 7

| Identifier | NAME | LoyID | Email | AID | Link |
|---|---|---|---|---|---|
| 1 | Alice | Loy1 | Smiths@1.com | AID1 | Link3 |
| 2 | Bob | Loy1 | Smiths@1.com | AID2 | |
| 3 | Alice | Loy1 | Alice@2.com | AID1 | Link1 |
| 4 | Charlie | NULL | Charlie@3.com | AID3 | |
| 5 | David | NULL | NULL | AID4 | |

FIG. 8

| AID | NAME | Email | RES # |
|---|---|---|---|
| AID1 | Alice | Smiths@2.com | R1 |
| AID2 | Bob | Smiths@1.com | R1 |
| AID1 | Alice | NULL | R2 |
| AID3 | Doug | NULL | R2 |
| AID4 | Charlie | Charlie@3.com | R3 |

FIG. 17

| AID | NAME | Email | RES # | SGID |
|---|---|---|---|---|
| AID1 | Alice | Smiths@2.com | R1 | SGID1 |
| AID2 | Bob | Smiths@1.com | R1 | SGID1 |
| AID1 | Alice | NULL | R2 | SGID1 |
| AID3 | Doug | NULL | R2 | SGID1 |
| AID4 | Charlie | Charlie@3.com | R3 | SGID2 |

FIG. 19

| RES # | Profile# | NAME | Email | Breakfast | Lunch | Dinner | Gym | Spa | Golf | Most Frequent Habit |
|---|---|---|---|---|---|---|---|---|---|---|
| R1 | P1 | Bob | Smiths@1.com | Y | N | N | N | Y | N | NULL |
| R2 | P2 | Alice | NULL | Y | N | N | Y | N | N | GYM |
| R3 | P2 | Alice | Smiths@2.com | N | N | N | Y | N | N | GYM |
| R4 | P3 | Charlie | Charlie@3.com | N | N | N | N | N | Y | NULL |
| R5 | P4 | Alice | Smiths@2.com | N | N | N | N | Y | N | GYM |
| R6 | P4 | Alice | Smiths@2.com | N | N | N | Y | N | N | GYM |
| R7 | P4 | Alice | NULL | N | N | N | Y | N | N | GYM |

FIG. 25

DEVICE, SYSTEM AND METHOD FOR ALTERING A MEMORY USING RULE SIGNATURES AND CONNECTED COMPONENTS FOR DEDUPLICATION

BACKGROUND

Memories may store more than one set of information that represent a same person and/or entity. For example, a person may be registered more than once in a memory, based on different interactions with computing systems that use the memory to store information regarding the interactions. Hence, later, when the sets of information are processed, for example to provide computer-based services to persons represented in the memory, redundancy in the computer-based services may occur, and hence waste processing resources in providing the computer-based services.

SUMMARY

An aspect of the present specification provides a method comprising: accessing, at one or more servers, one or more memories storing guest records identified by respective identifiers; generating, at the one or more servers, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule; generating, at the one or more servers, a graph comprising connected components of the plurality of rule signatures and respective identifiers, a connected component corresponding to a distinct guest of the guest records, and the connected component identified by an assigned identifier; and altering, via the one or more servers, the one or more memories to add assigned identifiers to the guest records that are identified by the respective identifiers associated with one or more respective rule signatures of the connected components.

Another aspect of the present specification provides a server comprising: a controller having access to one or more memories storing guest records identified by respective identifiers, the controller configured to: generate, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule; generate a graph comprising connected components of the plurality of rule signatures and respective identifiers, a connected component corresponding to a distinct guest of the guest records, and the connected component identified by an assigned identifier; and alter the one or more memories to add assigned identifiers to the guest records that are identified by the respective identifiers associated with one or more respective rule signatures of the connected components.

Another aspect of the specification provides a non-transitory computer-readable medium storing a computer program, wherein execution of the computer program is for: accessing, at one or more servers, one or more memories storing guest records identified by respective identifiers; generating, at the one or more servers, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule; generating, at the one or more servers, a graph comprising connected components of the plurality of rule signatures and respective identifiers, a connected component corresponding to a distinct guest of the guest records, and the connected component identified by an assigned identifier; and altering, via the one or more servers, the one or more memories to add assigned identifiers to the guest records that are identified by the respective identifiers associated with one or more respective rule signatures of the connected components.

Another aspect of the present specification provides a method comprising: selecting, using one or more servers, a first subset of guest records based on populated fields thereof which correspond to fields of one or more validated rules, the guest records stored at one or more memories; selecting, using one or more servers, a second subset of the guest records from the first subset based on respective populated fields thereof which correspond to respective fields of the one or more matching rules under test; determining, using the one or more servers, a ground truth number of distinct guests represented by the second subset of the guest records using the one or more validated rules; determining, using the one or more servers, a test number of distinct guests represented by the second subset of the guest records using the one or more matching rules under test; in response to determining that the test number meets one or more key performance indicators, based on a comparison with the ground truth number, validating, using the one or more servers, the one or more matching rules under test; and in response to determining that the test number does not meet the one or more key performance indicators, based on the comparison with the ground truth number, refining, using the one or more servers, the one or more matching rules under test.

Another aspect of the present specification provides a server comprising: a controller having access to one or more memories storing guest records, the controller configured to: select a first subset of guest records based on populated fields thereof which correspond to fields of one or more validated rules; select a second subset of the guest records from the first subset based on respective populated fields thereof which correspond to respective fields of the one or more matching rules under test; determine a ground truth number of distinct guests represented by the second subset of the guest records using the one or more validated rules; determine a test number of distinct guests represented by the second subset of the guest records using the one or more matching rules under test; in response to determining that the test number meets one or more key performance indicators, based on a comparison with the ground truth number, validate the one or more matching rules under test; and in response to determining that the test number does not meet the one or more key performance indicators, based on the comparison with the ground truth number, refine the one or more matching rules under test.

Another aspect of the specification provides a non-transitory computer-readable medium storing a computer program, wherein execution of the computer program is for: selecting, using one or more servers, a first subset of guest records based on populated fields thereof which correspond to fields of one or more validated rules, the guest records stored at one or more memories; selecting, using one or more servers, a second subset of the guest records from the first subset based on respective populated fields thereof which correspond to respective fields of the one or more matching rules under test; determining, using the one or more servers, a ground truth number of distinct guests represented by the second subset of the guest records using the one or more validated rules; determining, using the one or more servers, a test number of distinct guests represented by the second subset of the guest records using the one or more matching rules under test; in response to determining that the test number meets one or more key performance indicators, based on a comparison with the ground truth number, validating, using the one or more servers, the one or more matching rules under test; and in response to determining that the test number does not meet the one or more key performance indicators, based on the comparison with the ground truth number, refining, using the one or more servers, the one or more matching rules under test.

Another aspect of the specification provides a method comprising: accessing, at one or more servers, one or more memories storing the guest records identified by respective identifiers, the guest records including activity identifiers identifying activities associated with the guest records, wherein two or more guest records associated with a same activity have a same activity identifier; generating, at the one or more servers, a graph comprising connected components of the activity identifiers and respective identifiers, a connected component identified by an assigned identifier; and altering, via the one or more servers, the one or more memories to add the assigned identifiers to the guest records to identify socially associated guest records.

Another aspect of the specification provides a server comprising: a controller having access to one or more memories storing guest records identified by respective identifiers, the guest records including activity identifiers identifying activities associated with the guest records, wherein two or more guest records associated with a same activity have a same activity identifier, the controller configured to: generate a graph comprising connected components of the activity identifiers and respective identifiers, a connected component identified by an assigned identifier; and alter the one or more memories to add the assigned identifiers to the guest records to identify socially associated guest records.

Another aspect of the specification provides a non-transitory computer-readable medium storing a computer program, wherein execution of the computer program is for: accessing, at one or more servers, one or more memories storing the guest records identified by respective identifiers, the guest records including activity identifiers identifying activities associated with the guest records, wherein two or more guest records associated with a same activity have a same activity identifier; generating, at the one or more servers, a graph comprising connected components of the activity identifiers and respective identifiers, a connected component identified by an assigned identifier; and altering, via the one or more servers, the one or more memories to add the assigned identifiers to the guest records to identify socially associated guest records.

Another aspect of the specification provides a method comprising: accessing, at one or more servers, one or more memories storing guest records identified by respective identifiers, the guest records including habit identifiers identifying one or more habits of associated guests; identifying, at the one or more servers, most frequent habits based on the habit identifiers; and altering, via the one or more servers, the one or more memories to add most frequent habit identifiers to the guest records to identify the most frequent habits.

Another aspect of the specification provides a server comprising: a controller having access to one or more memories storing guest records identified by respective identifiers, the guest records including habit identifiers identifying one or more habits of associated guests, the controller configured to: identify most frequent habits based on the habit identifiers; and alter the one or more memories to add most frequent habit identifiers to the guest records to identify the most frequent habits.

Another aspect of the specification provides a non-transitory computer-readable medium storing a computer program, wherein execution of the computer program is for: accessing, at one or more servers, one or more memories storing guest records identified by respective identifiers, the guest records including habit identifiers identifying one or more habits of associated guests; identifying, at the one or more servers, most frequent habits based on the habit identifiers; and altering, via the one or more servers, the one or more memories to add most frequent habit identifiers to the guest records to identify the most frequent habits.

BRIEF DESCRIPTIONS OF THE DRAWINGS

For a better understanding of the various examples described herein and to show more clearly how they may be carried into effect, reference will now be made, by way of example only, to the accompanying drawings in which:

FIG. 4 depicts an example memory that may be altered using a method for altering a memory using rule signatures and connected components for deduplication, according to non-limiting examples.

FIG. 7 depicts another example graph, including connected components, that may be generated from the rule signatures using the method for altering a memory using rule signatures and connected components for deduplication, according to non-limiting examples.

FIG. 8 depicts the memory of FIG. 4, as altered, using the method for altering a memory using rule signatures and connected components for deduplication, according to non-limiting examples.

Figure 16:
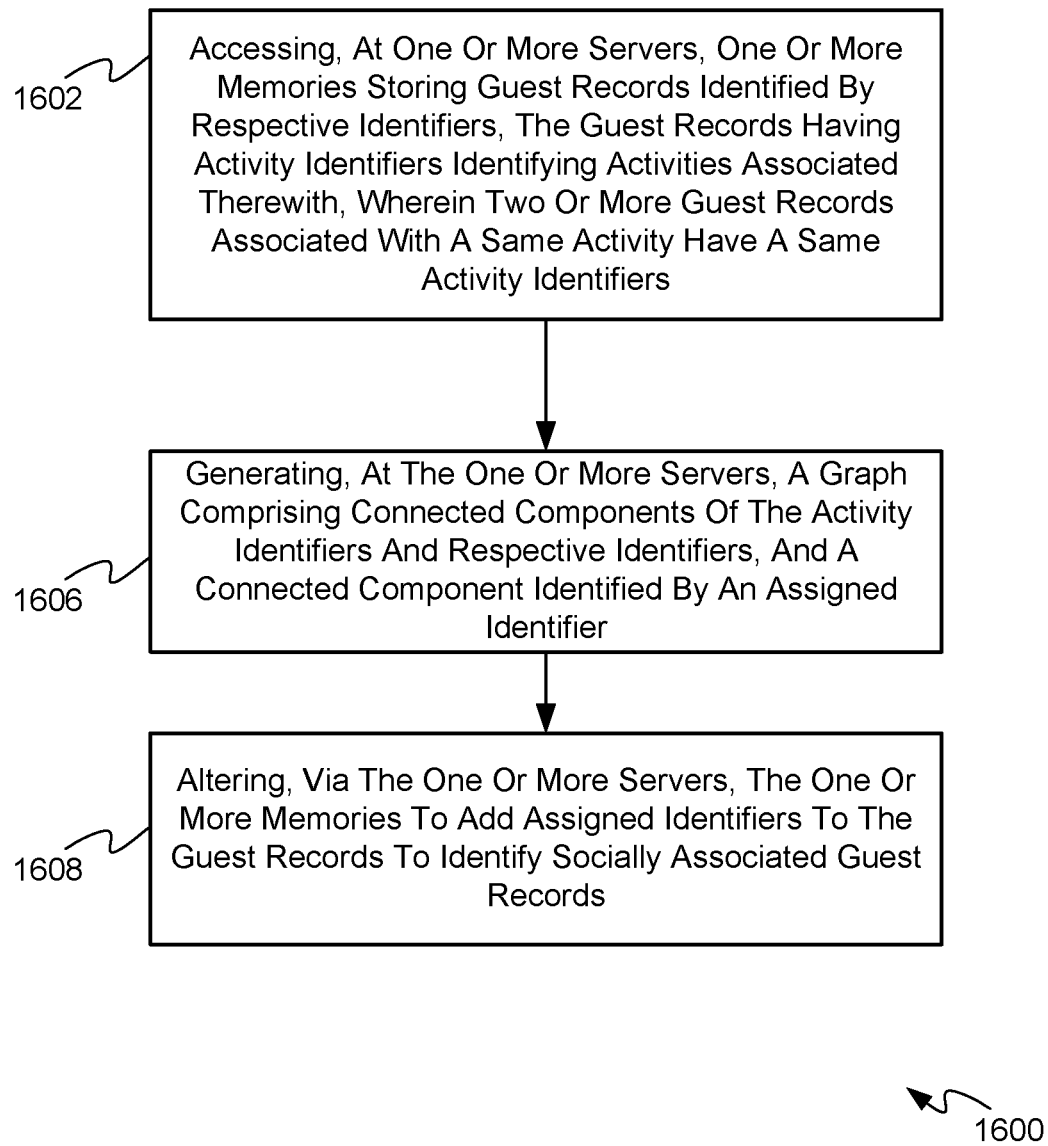

FIG. 16 a method for altering a memory using activities identified by guest records and connected components thereof, according to non-limiting examples.

FIG. 17 depicts a memory storing a set of guest records, and in particular travel reservations associated with activity identifiers, according to non-limiting examples.

Figure 18:
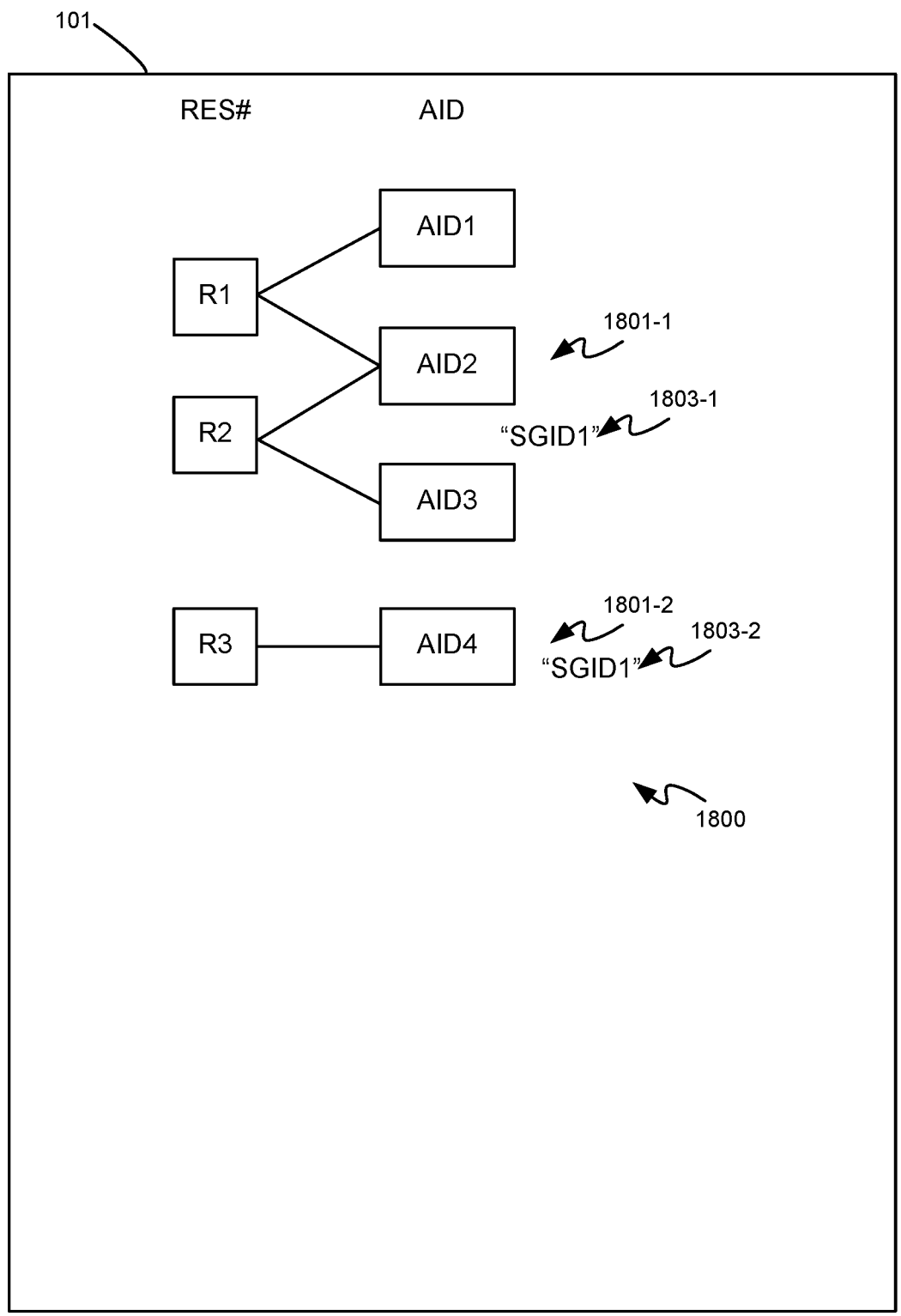

FIG. 18 depicts an example graph, including connected components, that may be generated from activity identifiers using the method for altering a memory using activities identified by guest records and connected components thereof, according to non-limiting examples.

FIG. 19 depicts an example of the memory of FIG. 17, as altered, using the method for altering a memory using activities identified by guest records and connected components thereof, according to non-limiting examples.

Figure 20:
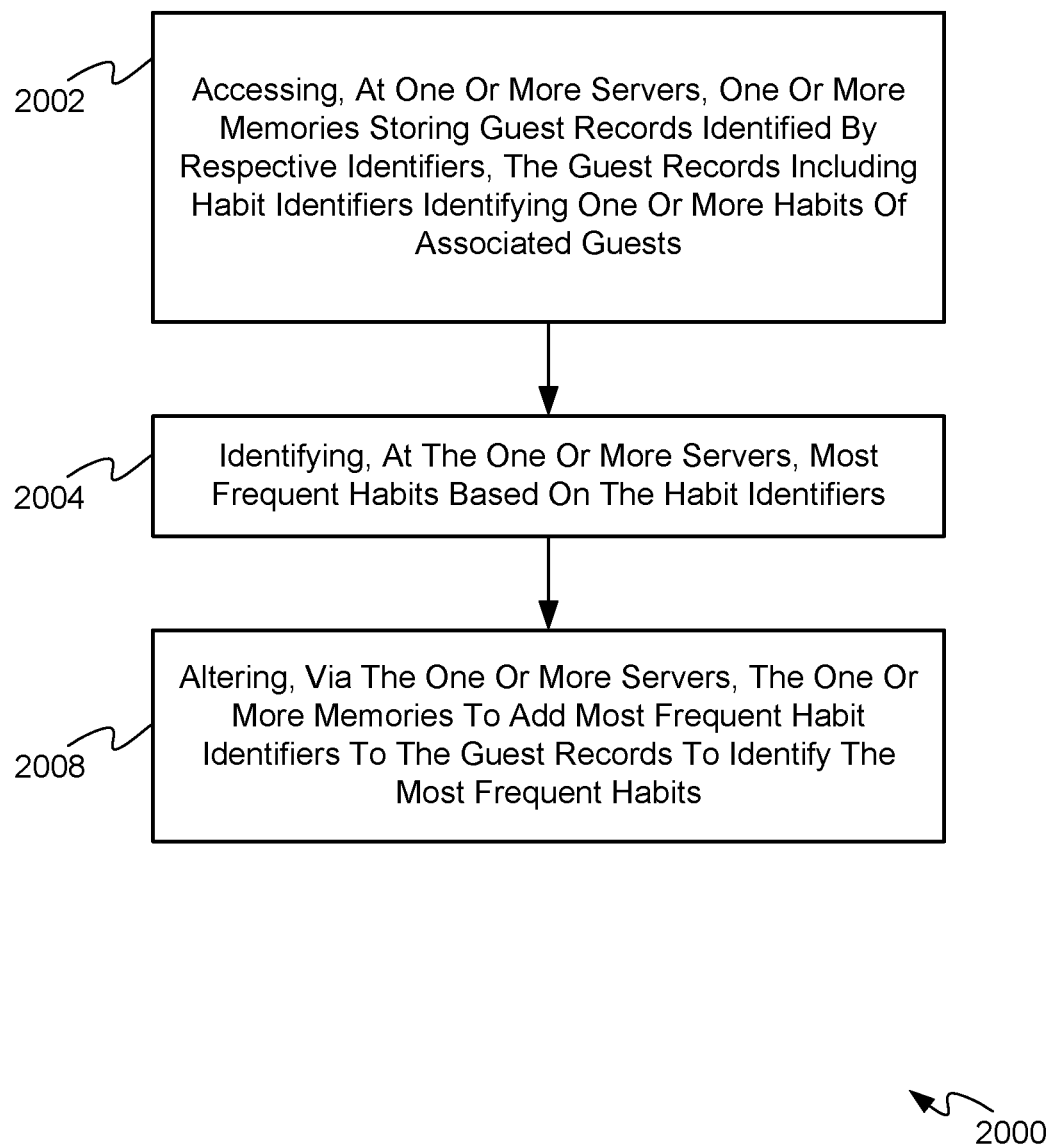

FIG. 20 a method for altering a memory to identify most frequent habits of guest records, according to non-limiting examples.

Figure 21:
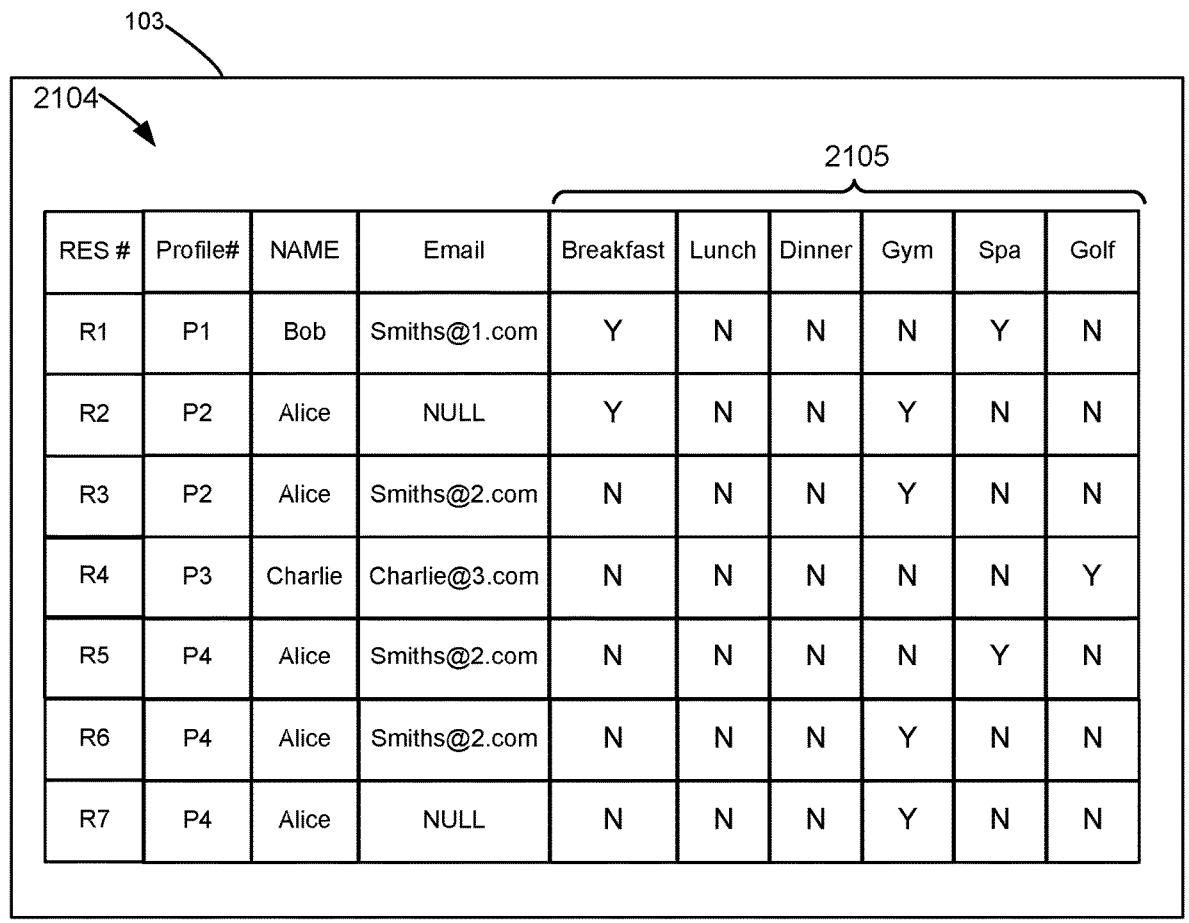

FIG. 21 depicts a memory storing a set of guest records that include habit identifiers, according to non-limiting examples.

Figure 22:
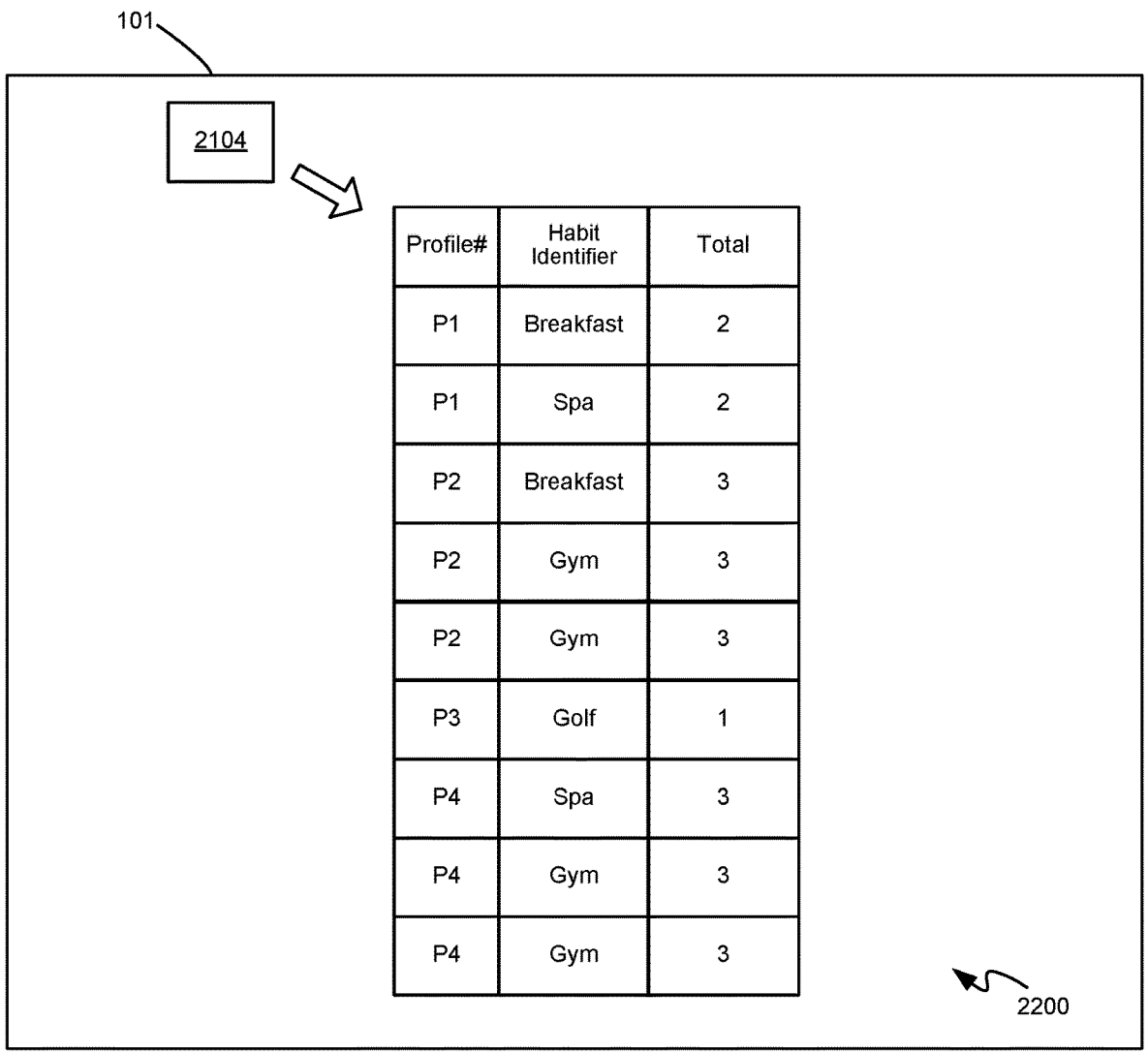

FIG. 22 depicts a server performing a portion of identifying most frequent habits based on a habit identifier, according to non-limiting examples.

Figure 23:
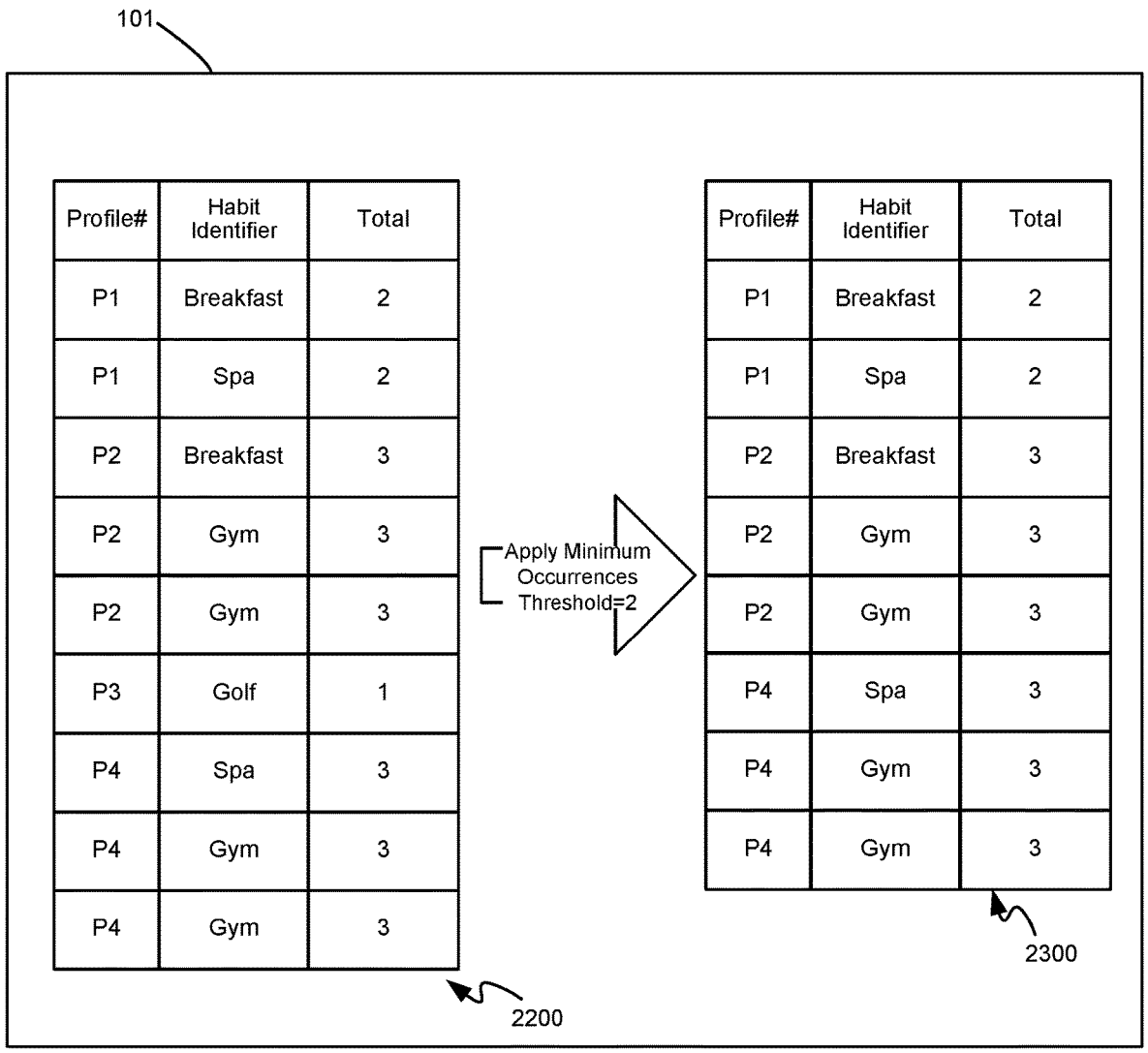

FIG. 23 depicts a server performing another portion of identifying most frequent habits based on a habit identifier, using a minimum number of occurrences threshold, according to non-limiting examples.

Figure 24:
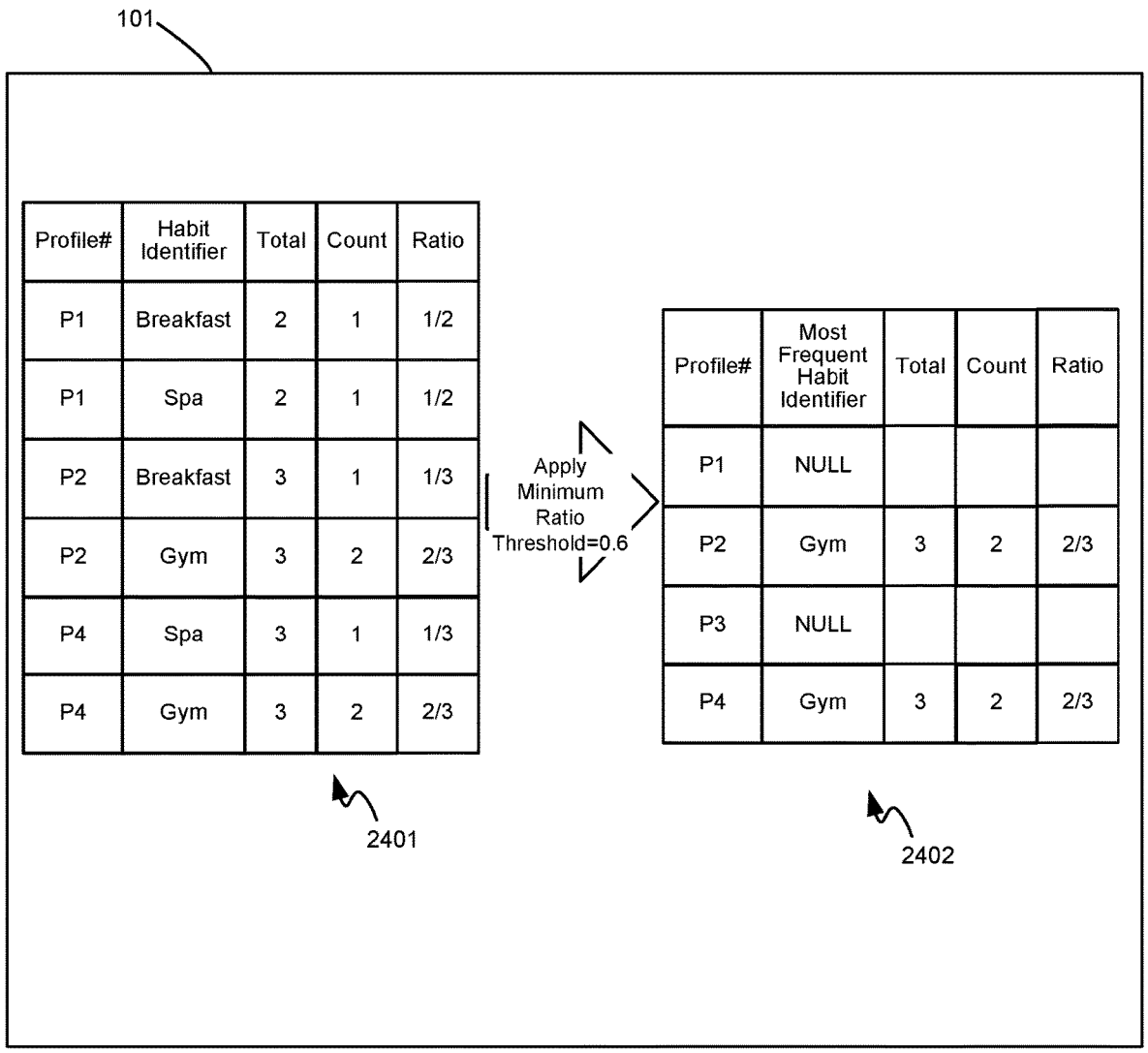

FIG. 24 depicts a server performing another portion of identifying most frequent habits based on a habit identifier, using a minimum ratio threshold, according to non-limiting examples.

FIG. 25 depicts an example of the memory of FIG. 21, as altered, using the method for altering a memory to identify most frequent habits of guest records, according to non-limiting examples.

DETAILED DESCRIPTION

Figure 1:
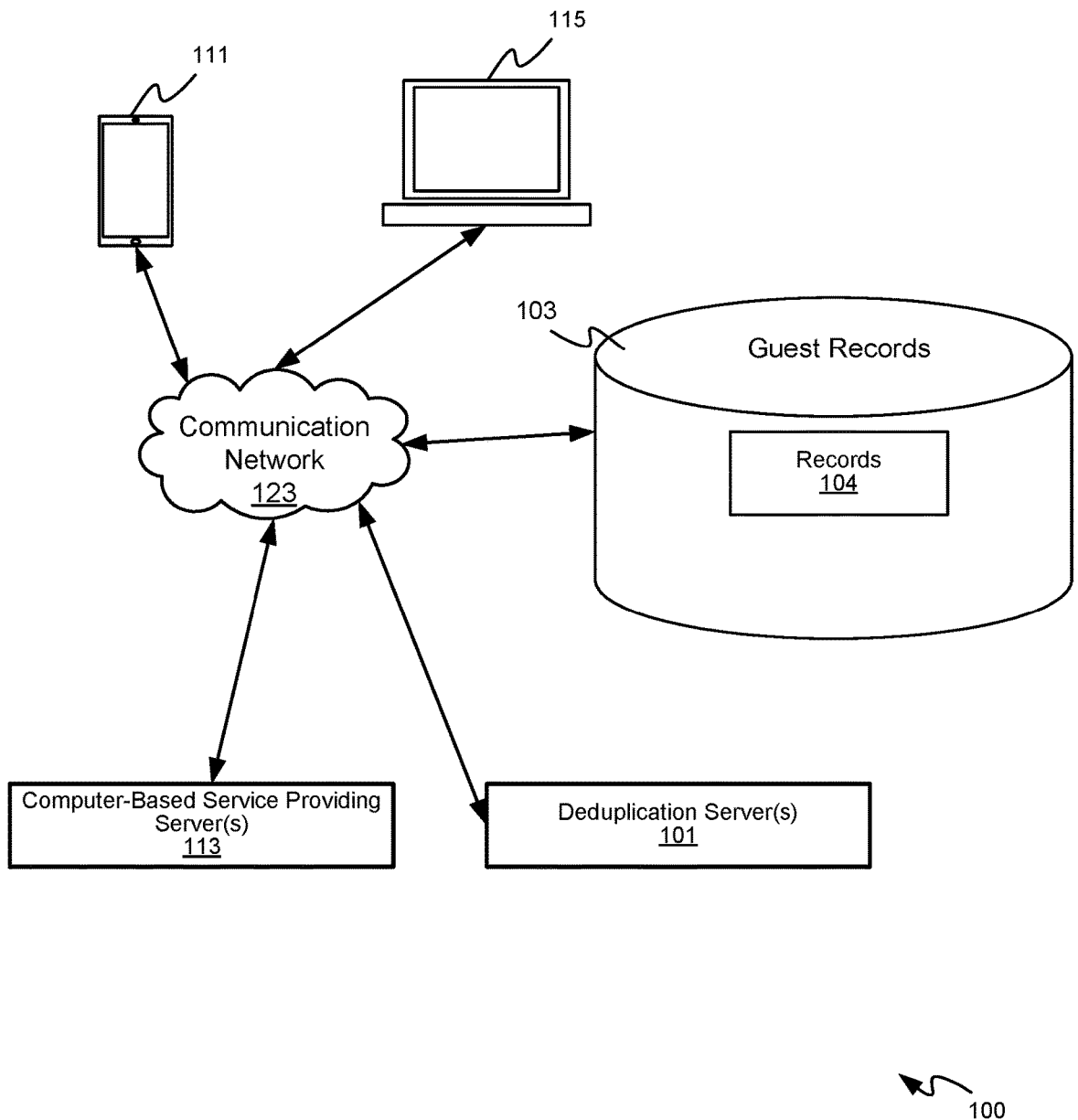
FIG. 1 depicts a system for altering a memory using rule signatures and connected components for deduplication, according to non-limiting examples.

Attention is directed to FIG. 1 which depicts a system 100 for altering a memory using rule signatures and connected components for deduplication. The system 100 includes: at least one deduplication server 101 for altering a memory using rule signatures and connected components for deduplication; and a memory 103 for storing records and in particular guest records 104. The guests records 104 may be stored in a database format (e.g. the memory 103 may comprise a database of the guest records 104) and/or any other suitable format including, but not limited to, a tabular format.

In particular, the at least one deduplication server 101 (referred to interchangeably hereafter as the server 101) is configured to alter the memory 103 using rule signatures and connected components to deduplicate the guest records 104, for example by adding assigned identifiers to the guest records 104 that identify unique guests and/or persons represented by the guest records 104, as described in more detail below.

As depicted, the system 100 further optionally comprises at least one communication device 111 to which computer-based services may be provided using the guest records 104; for example, the communication device 111 may be associated with a guest and/or person represented by the guest records 104. As depicted, the system 100 further optionally comprises at least server 113 which may be used to interact with the guest records 104, for example to provide computer-based services to guests and/or persons represented by the guest records 104. As depicted, the system 100 further optionally comprises at least one computing device 115 which may be used to interact with the guest records 104, for example to search the guest records 104 for unique guests and/or persons represented by the guest records 104 and/or to interact with the server 113 to provide services to the guests and/or persons represented by the guest records 104, and the like.

The components of the system 100 are generally in communication via a communication network 123 (interchangeably referred to hereafter as the network 123), and communication links between components of the system 100 are depicted in FIG. 1, and throughout the present specification, as double-ended arrows between respective components. The network 123 includes any suitable combination of wireless and/or wired communication networks and, similarly, the communication links may include any suitable combination of wireless and/or wired links.

While the functionality of the system 100 may be for processing any suitable records for deduplication, hereafter the system 100 will be described with respect to the guest records 104 which may represent travel service-based records for guests and/or persons represented by the guest records 104. Hereafter guests and/or persons represented by the guest records 104 are interchangeably referred to as guests. In some examples, a guest record 104 may comprise a "profile" for a guest and may include any suitable information regarding a guest. For example, the guest records 104 may represent travel-based loyalty information for guests including, but no limited to, membership information in travel-based loyalty programs, and the like. However, the guest records 104 may alternatively (and/or in addition to) represent any records for any travel-based services provided to guests, including, but not limited to, reservations such as airline reservations, hotel reservations, train reservations, cruise-ship reservations, and the like.

In some examples, as described in more detail below, guest records 104 are generally identified by respective identifiers and a guest record 104 may include, but is not limited to, a name of a guest stored in association with one or more of a loyalty program identification number, a network address (e.g. for messaging), an email address, a phone number, a time (which may include a date) that a guest record 104 was generated, and/or a time (which may include a date) of an associated reservation, and the like; however, a guest record 104 may comprise any suitable information, as described in more detail below.

The components of the system 100 (e.g. other than the network 123 and the communication device 111) may generally be associated with, and/or operated by an entity, such as a company, and the like, that may provide computer-based services, and in particular computer-based services for the travel industry, via the system 100.

The server 101 may comprise any suitable combination of one or more servers, cloud-based servers, computing devices, cloud-based computing devices, and the like, configured to for altering a memory using rule signatures and connected components for deduplication.

Similarly, the server 113 may comprise any suitable combination of one or more servers, cloud-based servers, computing devices, cloud-based computing devices, and the like. In some examples, the servers 101, 113 may be combined.

While the memory 103 is depicted as a standalone memory in form of a database, it is understood that the memory 103 may be a component of one or more servers, cloud-based servers, computing devices, cloud-based computing devices, and the like including, but not limited to one or more of the servers 101, 113. While particular database structures at the memory 103 are described herein, and in particular in a tabular format, the components and/or guest records 104 of the memory 103 may be stored according to any suitable structure and/or database structure and/or in any suitable manner. Furthermore, the memory 103 may maintain other types of data other than the guest records 104; for example, the memory 103 may maintain other types of travel-based information, and the like, that may be used to populate the guest records 104, including, but not limited, to social graph data, and the like, as described in more detail below.

While FIG. 1 depicts only one communication device 111, the system 100 may include any suitable number of communication devices 111. Furthermore, while the communication device 111 is depicted as a mobile device, in other examples the communication device 111 may comprise a personal computer, a laptop computer and the like.

Similarly, while FIG. 1 depicts only one computing device 115, the system 100 may include any suitable number of computing devices 115, for example configured to communicate with the server 101, for example via the network 123, for interacting with the server 113. For example, the computing device 115 may comprise a terminal operated by a travel agency, a hotel, an airline, and the like, which may generate guest records 104 and/or interact with existing guest records 104.

Before discussing the functionality of the system 100, certain components of the server 101 will be discussed in greater detail with reference to FIG. 2. While as described herein the server 101 is configured to alter a memory using rule signatures and connected components for deduplication, functionality of the server 101, may be distributed between the various components thereof, including, but not limited to, one or more of the server 113 and the computing device 115. Hence, one or more of the components of the system 100 generally includes one or more devices for altering a memory using rule signatures and connected components for deduplication.

Figure 2:
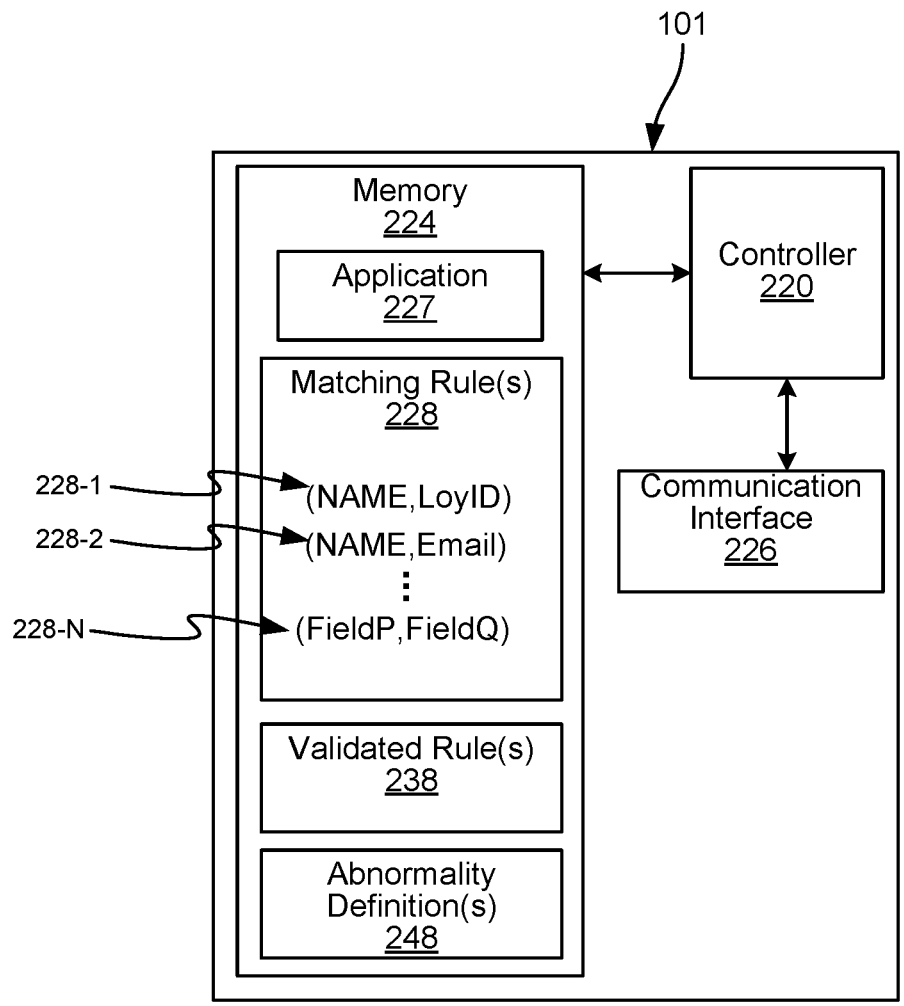
FIG. 2 depicts a device for altering a memory using rule signatures and connected components for deduplication, according to non-limiting examples.

As shown in FIG. 2, the server 101 includes at least one controller 220, such as one or more processors, central processing units (CPU), and the like. The controller 220 is interconnected with a memory 224, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The controller 220 and the memory 224 are generally comprised of one or more integrated circuits (ICs).

The controller 220 is also interconnected with a communication interface 226, which enables the server 101 to communicate with the other components of the system 100 via one or more communication links and/or the network 123. The communication interface 226 therefore includes any necessary components (e.g. network interface controllers (NICs), radio units, and the like) to communicate with the other components of the system 100 via the network 123. The specific components of the communication interface 226 are selected based on upon the communication links and/or the network 123. The server 101 can also include input and output devices connected to the controller 220, such as keyboards, mice, displays, and the like (not shown).

The components of the server 101 mentioned above can be deployed in a single enclosure, or in a distributed format, for example distributed geographically. In some examples, therefore, the server 101 includes a plurality of controllers, either sharing the memory 224 and communication interface 226, or each having distinct associated memories and communication interfaces. In some of these examples, the server 101 comprises one or more cloud-computing devices.

While not depicted, in some examples, the memory 224 may store the memory 103 and/or a portion thereof. The memory 224 stores a plurality of computer-readable programming instructions, executable by the controller 220, in the form of various applications, including an application 227 for altering a memory using rule signatures and connected components for deduplication. As will be understood by those skilled in the art, the controller 220 executes the instructions of the application 227 (and any other suitable applications) in order to perform various actions defined by the instructions contained therein. In the description below, the controller 220, and more generally the server 101, may be configured to perform those actions. It will be understood that they are so configured via the execution (by the controller 220) of the instructions of the applications stored in memory 224.

Execution of the application 227 by the controller 220, configures the controller 220 and/or the server 101 to: access one or more memories (e.g. memory 103) comprising guest records (e.g. the guest records 104) identified by respective identifiers; generate, using one or more matching rules (e.g. the matching rules 228), a plurality of rule signatures from the guest records, a rule signature associated with a respective identifier of a guest record from which the rule signature was generated, the rule signature comprising a string of values from the guest record that are substituted for corresponding information defined by an associated matching rule; generate (e.g. in any suitable format) a graph comprising connected components of the plurality of rule signatures and respective identifiers, a connected component corresponding to a distinct guest of the guest records, and the connected component identified by an assigned identifier; and alter the one or more memories to add assigned identifiers to the guest records that are identified by the respective identifiers associated with one or more respective rule signatures of the connected components.

In particular, as depicted, the memory 224 stores one or more matching rules 228 which may be used by the controller 220 when executing the application 227. Alternatively, the matching rules 228 may be components of the application 227. In particular, as depicted, the memory stores an integer number of "N" matching rules 228-1, 228-2 . . . 228-N, with "N" being as low was "1" (e.g. one matching rule 228); however, the memory 224 may store any suitable number of matching rules 228 (e.g. "N" may be any suitable number). In general, a matching rule 228 comprises fields that correspond to given respective fields of a guest record 104 from which values are to be retrieved and used to populate a resulting rule signature as described in more detail below.

For example, a matching rule 228-1 comprises a field "NAME" and a field "LoyID"; the field "NAME" corresponds to a name of a guest in a corresponding "NAME" field of a guest record 104, and the field "LoyID" corresponds to a loyalty program number of a guest in a corresponding "LoyID" field of guest record 104. As depicted, the matching rule 228-1 further comprises a comma between the fields, which may be used as a delimiter between information used to populate a corresponding rule signature. Hence, for example, when a guest record 104 includes both a name and a loyalty program number, a corresponding rule signature for the guest record 104 may be generated comprising the name and the loyalty program number separated by a comma. However, in other examples of matching rules 228, no delimiter may be used, and/or other delimiters may be used (e.g. other than commas including, but not limited to, spaces, slashes and the like), and/or more than one delimiter may be used (e.g. a comma and a space, and the like).

Similarly, a matching rule 228-2 comprises a field "NAME" and a field "Email"; the field "NAME" corresponds to a name of a guest of a guest record 104, and the field "Email" corresponds to an email address of a guest of a guest record 104 (however any suitable network address for messaging is within the scope of the present specification). As depicted, the matching rule 228-2 further comprises a comma between the fields, which may be used as a delimiter between information used to populate a corresponding rule signature. Hence, for example, when a guest record 104 includes both a name and an email address, a corresponding rule signature for the guest record 104 may be generated comprising the name and the email address separated by a comma.

Structure of a matching rule 228 is shown generically by the matching rule 228-N which comprises a field "FieldP" and a field "FieldQ" separated by a comma. Hence, for example, when a guest record 104 includes values in both a field "FieldP" and a field "FieldQ", a corresponding rule signature for the guest record 104 may be generated comprising the values of the field "FieldP" and the field "FieldQ" separated by a comma.

As will be described in more detail below, when a field of a guest record 104, defined by a matching rule 228, is not populated and/or includes a "NULL" value, and the like, and another field of the guest record 104 defined by the matching rule 228 is populated, a rule signature is not generated.

In some examples, the application 227 may include machine learning and/or deep-learning and/or neural network-based algorithms, and the like, which have been trained and/or configured to implement at least a portion of the functionality of the server 101. The one or more machine learning algorithms and/or deep learning algorithms of the application 227 may include, but are not limited to: a generalized linear regression algorithm; a random forest algorithm; a support vector machine algorithm; a gradient boosting regression algorithm; a decision tree algorithm; a generalized additive model; evolutionary programming algorithms; Bayesian inference algorithms, reinforcement learning algorithms, and the like. However, any suitable machine learning algorithm and/or deep learning algorithm and/or neural network algorithm is within the scope of present examples.

As depicted, the memory 224 optionally stores one or more validated rules 238 comprising rules that may be used to generate a ground truth number of distinct guests of a subset of the guest records 104, as described in more detail below with respect to FIG. 13, FIG. 14 and FIG. 15.

As depicted, the memory 224 optionally stores abnormality definitions 248 comprising data that may be used to determine guest records 104 having abnormal content and/or outlier guest records 104, as described in more detail below.

It is further understood that the application 227 may include modules, and the like, for implementing other functionality when processed by the controller 220 including, but not limited to, validating matching rules (e.g. as described below with respect to FIG. 13 to FIG. 15), altering a memory using activities identified by guest records and connected components thereof (e.g. as described below with respect to FIG. 16 to FIG. 19), altering a memory to identify most frequent habits of guest records (e.g. as described below with respect to FIG. 20 to FIG. 25), and the like.

While structure of the server 113 and the devices 111, 115 is not described in detail, the server 113 and the devices 111, 115 are understood to have a similar structure as the server 101, but adapted for the functionality of the server 113 and the devices 111, 115. For example, each of the devices 111, 115 may generally include one or more input devices (e.g. such as keyboards, pointing devices, microphones and the like), and one or more output devices (e.g. display screens, speakers, and the like) to enable interaction with the devices 111, 115 by a respective user.

Figure 3:
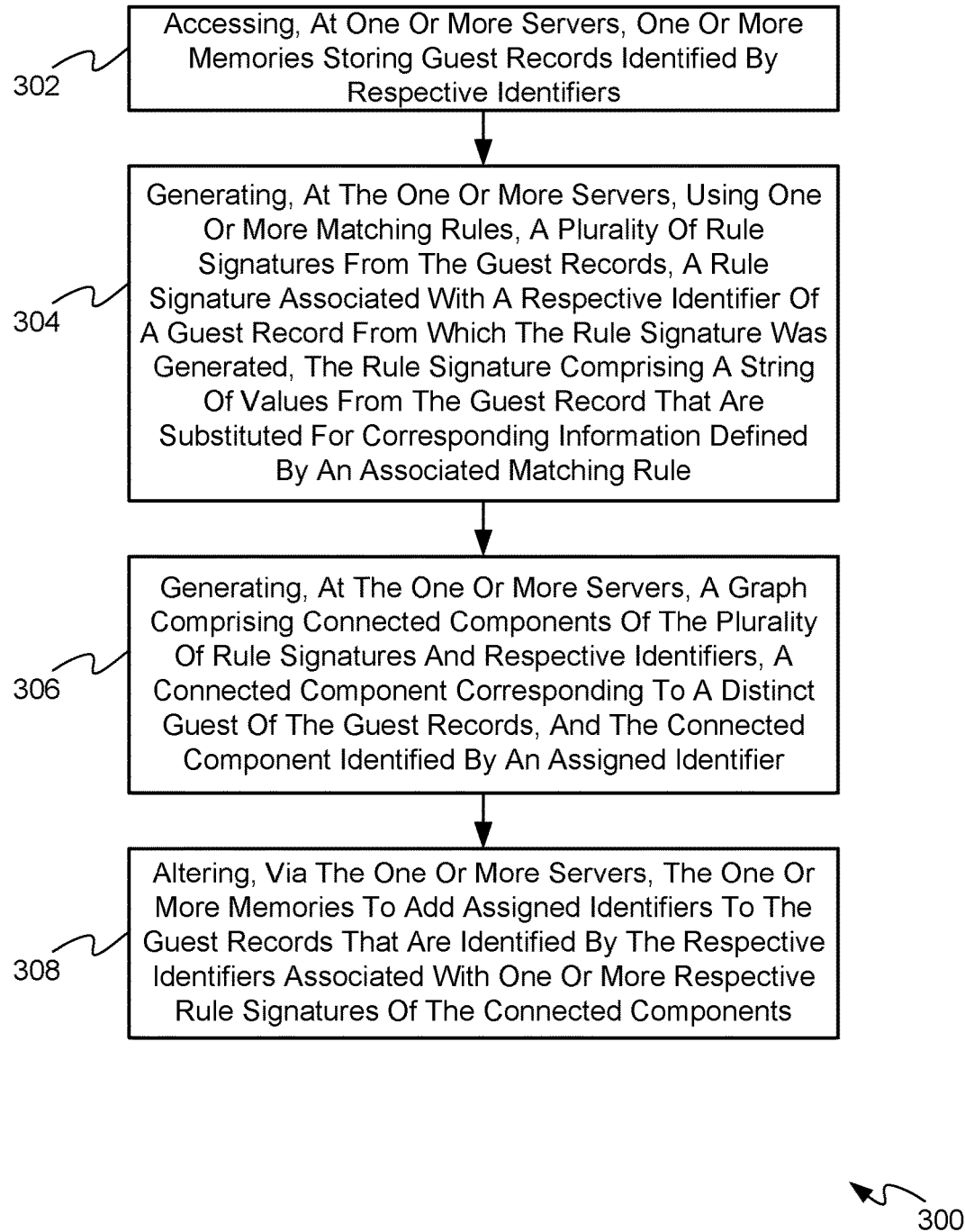
FIG. 3 depicts a method for altering a memory using rule signatures and connected components for deduplication, according to non-limiting examples.

Attention is now directed to FIG. 3 which depicts a flowchart representative of a method 300 for altering a memory using rule signatures and connected components for deduplication. The operations of the method 300 of FIG. 3 correspond to machine readable instructions that are executed by the server 101, and specifically the controller 220 of the server 101. In the illustrated example, the instructions represented by the blocks of FIG. 3 are stored at the memory 224 for example, as the application 227. The method 300 of FIG. 3 is one way in which the controller 220 and/or the server 101 and/or the system 100 may be configured. Furthermore, the following discussion of the method 300 of FIG. 3 will lead to a further understanding of the system 100, and its various components.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 220 and/or the server 101 accesses the one or more memories 103 storing the guest records 104 identified by respective identifiers. The respective identifiers may comprise database identifiers and/or any other suitable type of identifier which may be used to identify records at a memory and/or a database. It is further understood that the respective identifiers may refer to a single guest record 104 and/or a group of guest records belonging to a pre-existing aggregate of guest records (e.g., lines associated to a single profile, single reservation and the like); for example, while examples herein are described with respect to the guest records 104 comprising profiles, in other examples the guest records 104 may comprise reservations and/or messages associated with reservations, which may be stored on different rows, and the like, of a database, but identified via a same identifier.

At a block 304, the controller 220 and/or the server 101 generates, using the one or more matching rules 228, a plurality of rule signatures from the guest records 104. As will be described in more detail below, the controller 220 and/or the server 101 generally associates a rule signature, as generated, with a respective identifier of a guest record 104 from which the rule signature was generated. In general, a rule signature comprises a string of values from the guest record 104 that are substituted for corresponding information defined by an associated matching rule 228. For example, as described above, values of fields of a guest record 104, that are defined by a matching rule 228, are used to populate the fields defined by a matching rule 228 to generate a rule signature.

In particular when a guest record 104 includes fields defined by a matching rule 228, and such fields are populated, the controller 220 and/or the server 101 may determine that the guest record 104 "matches" the matching rule 228 and generate a rule signature for the guest record 104 accordingly. Indeed, such a rule signature may be referred to as a rule signature of a given guest record 104 for a given matching rule 228.

On the other hand, when a guest record 104 does not include one or more fields defined by a matching rule 228, the controller 220 and/or the server 101 may determine that the guest record 104 does not "match" the matching rule 228 and no rule signature is generated for the guest record 104 for that matching rule 228.

Similarly, when a guest record 104 includes fields defined by a matching rule 228, but one or more such fields are not populated and/or populated with a "NULL" value, and the like, the controller 220 and/or the server 101 may determine that the guest record 104 does not "match" the matching rule 228 and no rule signature is generated for the guest record 104 for that matching rule 228. Hence, a rule signature for a guest record 104 may be generated only when values of fields of the guest record 104 defined by a matching rule 228 are populated; put another way, a rule signature for a guest record 104 may be generated only when values of fields of the guest record 104 defined by a matching rule 228 are populated by non-NULL values.

In some examples, the values from a guest record 104 used to generate a rule signature may be concatenated based on a format of a corresponding matching rule 228. Put another way, a matching rule 228, used to generate one or more of the plurality of rule signatures (e.g. at the block 304), comprises information for generating a concatenated string of values from the guest records 104. Example of rule signatures generated by concatenating strings of values from the guest records 104 are described in more detail below with respect to FIG. 4 and FIG. 5.

At a block 306, the controller 220 and/or the server 101 generates a graph comprising connected components of the plurality of rule signatures and respective identifiers, a connected component corresponding to a distinct guest of the guest records 104, and the connected component identified by an assigned identifier.

While a graph of connected components may be generated in a graphical format, the term "graph" is understood to include any suitable structure that shows connected components, and that may be presented in any suitable format. For example, the structure of such a graph need not be provided in a graphical format at the block 306. In a particular example, a suitable structure that shows connected components may be provided in a tabular format, and/or a database format. Hence, for example, the graph of the block 306 may be generated in one or more of a graphical format, a tabular format, a database format, and the like. Examples of graphs are described below with respect to FIG. 6 and FIG. 7.

Furthermore, it is understood that a graph of the block 306 generally includes vertices, which may be connected by one or more paths and/or edges, and that connected components may include one or more vertices. Indeed, a connected component may include one vertex that is not connected to another vertex and/or a connected component may include two or more vertices that are connected by at least one path and/or edge. Hereafter, the terms "path" and "edge" are used interchangeably. Furthermore, it is understood that a connected component of the graph of the block 306 comprises a portion of the graph that includes one (e.g. unconnected) vertex and/or a portion of the graph in which two or more vertices are connected to each other by one or more edges, but which are not connected to additional vertices in the graph. Hence, for example, a graph may comprise one or more connected components. In particular, a graph may comprise one connected component when all vertices of the graph are connected via one or more edges; however, when a graph includes two or more connected components, each connected component comprises one vertex, or two or more vertices connected to each other by one or more edges, but the vertices of one connected component are not connected to the vertices of any other connected component.

As will be described in more detail below, vertices of a given connected component of the graph of the block 306 may comprises respective guest record identifiers and associated rule signatures, and edges of a given connected component may comprise lines (e.g. edges and/or paths) between the respective guest record identifiers and the associated rule signatures.

Furthermore, as will be understood from examples described below, each connected component corresponds to a distinct guest of the guest records 104. Hence, a number of the connected components generally corresponds to a number of the distinct guests represented by the guest records 104. As such, an identifier is generally assigned to the distinct guest and/or a connected component corresponding to the distinct guest.

Put another way, the controller 220 and/or the server 101 searches the memory 103 for guest records 104 that include common information and determines that two or more guest records 104 are associated with a same distinct guest when common information therebetween is found. In a particular example, two guest records 104 may include a common email address, but different loyalty program numbers for a guest, while a third guest record 104 may include a different email address, but a same loyalty program number as one of the two guest records 104 that include the common email address; in this example, the controller 220 and/or the server 101 may determine that all three of the guest records 104 are associated with one connected component and hence associated with one distinct guest. Such situations may occur, for example, when a guest registers more than once for a loyalty program under different email addresses and the like, and/or registers for a loyalty program using both personal and work information, and the like, and/or at different times.

At a block 308, the controller 220 and/or the server 101 alters the one or more memories 103 to add the assigned identifiers to the guest records 104 that are identified by the respective identifiers associated with one or more respective rule signatures of the connected components. For example, an assigned identifier may be added to a guest record 104 of a connected component and groups of guest records 104 associated with a same assigned identifier may be associated with the same distinct guest, regardless of the information stored therein.

Furthermore, in some examples, at the block 308, the controller 220 and/or the server 101 may alter the one or more memories 103 to add links between the guest records 104 that are identified by common assigned identifiers, as described in more detail below.

In some examples, the controller 220 and/or the server 101 may merge and/or delete duplicate guest records 104 (e.g. duplicate guest records 104 comprising a plurality of guest records 104 associated with the same distinct guest) such that the memory 103 stores one guest record 104 for a distinct guest. However, such merging and/or deleting may be undesirable, for example when a different guest record 104 for a distinct guest may be maintained for their personal information (e.g. a personal profile) and for their work information (e.g. a work profile). Hence, generally, the controller 220 and/or the server 101 may refrain from merging and/or deleting duplicate guest records 104; rather common assigned identifiers of guest records 104 are used to identify distinct guests in the memory 103 to maintain a current structure of the guest records 104 and/or so as to maintain different profiles for the guests and/or so as to not discard and/or delete guest reservations (e.g. whether historical or current).

The memory 103 storing the guest records 104, as altered at the block 308 of the method 300, may be used to provide computer-based services to the guests. For example, the computing device 115 may be used to search the memory 103 for a distinct guest using a name, an email address, and the like; the computing device 115 may then retrieve not only one guest record 104 that matches the information used to search the memory 103, but also other guest records 104 that have a same assigned identifier as a guest record 104 that matches the information used to search the memory 103. Hence, the computing device 115 may quickly and efficiently find guest records 104 associated with a distinct guest, rather than waste processing resources and/or bandwidth resources searching for other guest records 104. For example, when a guest interacts with a user of the computing device 115, giving them a name and/or email address and the like, and the guest wishes to know their loyalty program number, the computing device 115 may quickly determine whether the guest is associated with more than one loyalty program number (e.g. assuming the guest is associated with two or more guest records 104 having a same name, different email addresses, and different loyalty program numbers and/or when couples and/or families share loyalty numbers, and the like). An example of such an interaction is described below with respect to FIG. 9, FIG. 10 and FIG. 11.

Similarly, the server 113 may generate a message (e.g. an email offering reduced costs for a travel-related service, and the like) using the guest records 104, and transmit the message email (e.g. via the network 123) to one network address and/or email address for a distinct guest indicated by an assigned identifiers of the guest records 104, but not to all network addresses email addresses of the distinct guest, to avoid duplication of emails to distinct guests, and reduce processing resources and bandwidth usage in the system 100. An example of such messaging is described below with respect to FIG. 12.

In some examples, the controller 220 and/or the server 101 may be adapted to implement the block 304 and/or the block 306 in a manner which excludes guest records 104 having abnormal content; such guest records 104 may alternatively be referred to as "outlier" guest records 304. In particular "abnormal content" may be defined by one or more abnormality definitions 248 which may be generated by an administrator of the system 100 and/or "learned" by a machine learning algorithm, with the application 227 configured accordingly. As described above, such abnormality definitions 248 may be stored at the memory 224 of the server 101, and the like. In a particular example, a travel agency may be generating guest records for 104 for a plurality of guests, and using a phone number of the travel agency as a phone number and/or an email address for the guests in the guest records 104. Hence, in some examples, a given number of guest records 104 having similar and/or the same content in a given field may be determined to include abnormal content and be excluded from implementations of the block 304 and/or the block 306. For example, when the guest records 104 comprise travel reservations, when a given threshold number of the travel reservations have a same phone number and/or a same email address that is used to make the travel reservations, in a given time period, then such guest records 104 comprising such travel reservations may be excluded when determining rule signatures and/or connected components thereof. A given threshold number may be determined in any suitable manner and stored in the abnormality definitions 248; in one non-limiting example, a heuristic analysis has shown that guest records 104 comprising travel reservations generated with an email address that has made more than "32" reservations in a timespan of a year may be designated as having abnormal content and/or as outlier guest records 104, and excluded from the implementation of the method 300 and/or the block 304 and/or the block 306. However, any suitable method of determining abnormal content is within the scope of the present specification including, but not limited to, any suitable statistical analysis of the guest records 104 and/or any suitable number of reservations in a timespan of a year may be used as a threshold number.

Put another way, the method 300 may further comprise the controller 220 and/or the server 101: identifying respective guest records 104 associated with abnormal content as defined by one or more abnormality definitions; and removing the respective guest records 104 associated with the abnormal content from one or more of generating the rule signatures and generating the graph. Put yet another way, the method 300 may further comprise the controller 220 and/or the server 101: identifying respective guest records 104 associated with a number of travel reservations that is above a given threshold number of the travel reservations; and, one or more of: excluding the respective guest records 104 from the generating the plurality of rule signatures (e.g. at the block 304); and excluding the respective guest records from the generating of the graph (e.g. at the block 306).

Attention is next directed to FIG. 4 which depicts an example of the guest records 104 as stored at the memory 103, prior to implementation of the method 300. As depicted, the guest records 104 comprise five guest records 104-1, 104-2, 104-3, 104-4, 104-5 arranged in a tabular format, with each row of the depicted table, other than a header row, corresponding to a guest record 104. Each guest record 104 is identified by a respective identifier 401 that, as depicted, corresponds to a row identifier in the first column of the table; for example, the guest record 104-1 is identified by an identifier 401 "1", the guest record 104-2 is identified by an identifier 401 "2", etc.

The guest records 104 include a field "NAME", in a second column of the table, for a name of an associated guest. For example, the guest record 104-1 is associated with a name "Alice", the guest record 104-2 is associated with a name "Bob", etc. As depicted the guest records 104-1, 104-3 are each associated with the same name "Alice" indicating that the guest records 104-1, 104-3 may be a duplication of each other and/or represent a same distinct guest (e.g. named "Alice"). While only a field for one name is depicted, in other examples a guest record may fields for include a first name and a last name, and the like.

Similarly, guest records 104 include a field "LoyID", in a third column of the table, for a loyalty program number and/or loyalty identifier of an associated guest. For example, the guest record 104-1, 104-2, 104-3 are associated with a loyalty program number "Loy1", indicating that the guest records 104-1, 104-2, 104-3 may be a duplication of each other and/or represent a same distinct guest (e.g. having a loyalty number "Loy1").

Similarly, guest records 104 include a field "Email", in a fourth column of the table, for an email address of an associated guest. For example, the guest records 104-1, 104-2, are all associated with a same email address "Smiths@1.com", indicating that the guest records 104-1, 104-2 may be a duplication of each other, while the guest record 104-3 (e.g. having a same loyalty program number as the guest records 104-1, 104-2) is associated with an email address "Alice@2.com".

Such an example is depicted to illustrate possible duplication of information between guest records 104 that may lead to unnecessary use of processing resources and/or bandwidth resources in the system 100 prior to implementation of the method 300. Furthermore, such an example shows that application of simple rules for resolving duplications may be ineffective as the "NAME" field indicates a possible duplication between the guest records 104-1, 104-3, the "LoyID" field indicates a possible duplication between the guest records 104-1, 104-2, 104-3, and "Email" field indicates a possible duplication between the guest records 104-1, 104-2. Hence, it is understood herein that the term "duplication" refers to two or more records in a memory (e.g. and/or a database) that are associated with a same distinct person.

While all the fields of the guest records 104-1, 104-2, 104-3 include values, the field "LoyID" of the guest records 104-4, 104-5 are "NULL", and the field "Email" of the guest record 104-5 is also "NULL"; hence, for example, the guests associated with the guest records 104-4, 104-5 may have never been assigned a loyalty program number, and similarly, the guest associated with the guest record 104-5 may never have supplied an email address.

While the guest records 104 are depicted in FIG. 4 as including particular fields, the guest records 104 may include any suitable fields including, but not limited to one or more of: a name of a guest; an identifier of the guest; a personal identifier of the guest; an address of the guest; a company of the guest; payment information associated with the guest; credit card information associated with the guest; a language preference of the guest; a birthday of the guest; a most used product of the guest (e.g. a particular airline); a most frequent travel companion of the guest; a reservation channel of the guest (e.g. a particular website, a particular travel agent, and the like); a gender of the guest; a name prefix of the guest; a name suffix of the guest; a string transformation associated with the guest (e.g. combination of parts of a guest's name as often used in reservation systems and/or a customer's initials, and the like); an online identifier of the guest (e.g. a nickname and/or alias on a website, and the like); a loyalty identifier of the guest (e.g. the loyalty program number referred to herein); a network identifier of the guest; an email address of the guest; a telephone number of the guest; a most visited destination for the guest; a social graph identifier for the guest (described in more detail below); a reservation identifier for the guest; travel booker and/or travel agent information; and the like. Furthermore, the fields of the guest records 104 may include conditional fields and/or probabilistic-based fields and/or frequency-based fields, described in more detail below.

Figure 5:
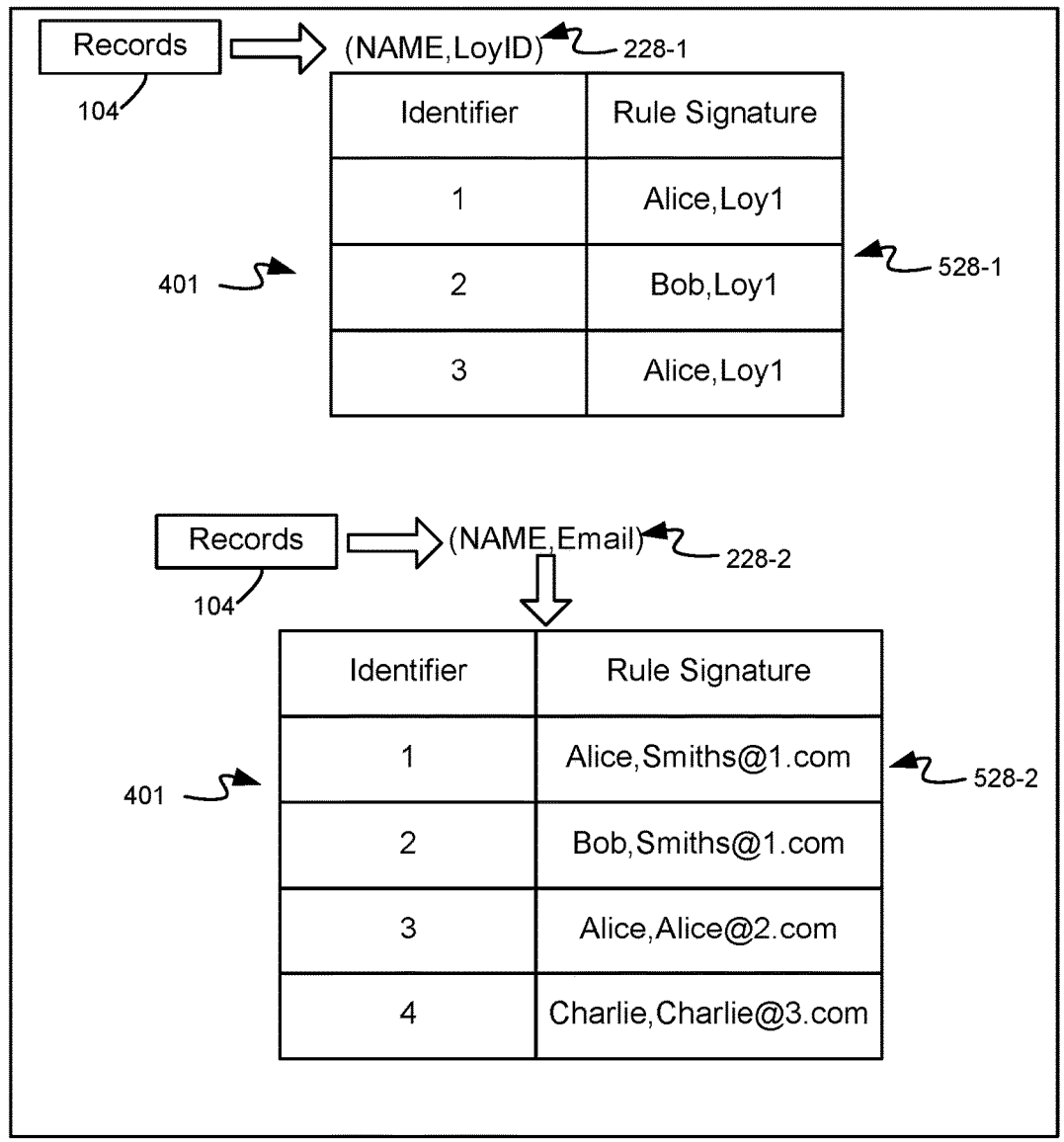
FIG. 5 depicts an example of generating rule signatures using the method for altering a memory using rule signatures and connected components for deduplication, according to non-limiting examples.

Attention is next directed to FIG. 5 which depicts the server 101 implementing an example of the block 302 and the block 304 of the method 300 using the example guest records 104 of FIG. 4. In particular, the server 101 has accessed the memory 103 (e.g. at the block 302 of the method 300) to retrieve the guest records 104, and is using the example matching rules 228 of FIG. 2 to generate (e.g. at the block 304 of the method 300) rule signatures.

For example, as depicted, the server 101 applies the matching rule 228-1 to the guest records 104 to determine the guest records 104 which include values in both the "NAME" field and the "LoyID" field. With brief reference back to FIG. 4, the guest records 104-1, 104-2, 104-3 meet these conditions and hence rule signatures 528-1 are generated therefrom; in particular, rule signatures 528-1 "Alice, Loy1", "Bob,Loy1" and "Alice,Loy1" are generated and associated with the identifier 401 (e.g. row number) of the guest record 104 from which a rule signature 528-1 was generated. Hence, for example, as the rule signature 528-1 "Alice,Loy1" was generated from the guest record 104-1 (e.g. by concatenating the "NAME" "Alice" with the "LoyID" "Loy1", separated by a comma ","), the rule signature 528-1 "Alice,Loy1" is associated with the identifier 401 "1", etc.

Similarly, as depicted, the server 101 applies the matching rule 228-2 to the guest records 104 to determine the guest records 104 which include values in both the "NAME" field and the "Email" field. With brief reference back to FIG. 4, the guest records 104-1, 104-2, 104-3, 104-4 meet these conditions and hence rule signatures 528-2 are generated therefrom; in particular, rule signatures 528-2 "Alice, Smiths@1.com", "Bob, Smiths@1.com", "Alice, Alice@2.com" and "Charlie,Charlie@3.com" are generated and associated with the identifier 401 (e.g. row number) of the guest record 104 from which a rule signature 528-2 was generated. Hence, for example, as the rule signature 528-2 "Alice,Smiths@1.com" was generated from the guest record 104-1 (e.g. by concatenating the "NAME" "Alice" with the "Email" "Smiths@1.com", separated by a comma "," the rule signature 528-2 "Alice,Smiths@1.com" is associated with the identifier 401 "1", etc. Hereafter, the rule signatures 228-1, 228-2 are interchangeably referred to, collectively, as the rule signatures 228 and, generically, as a rule signature 228.

Furthermore, it is understood that "NULL" values for fields are ignored when generating the rule signatures 228, as described above.

Figure 6:
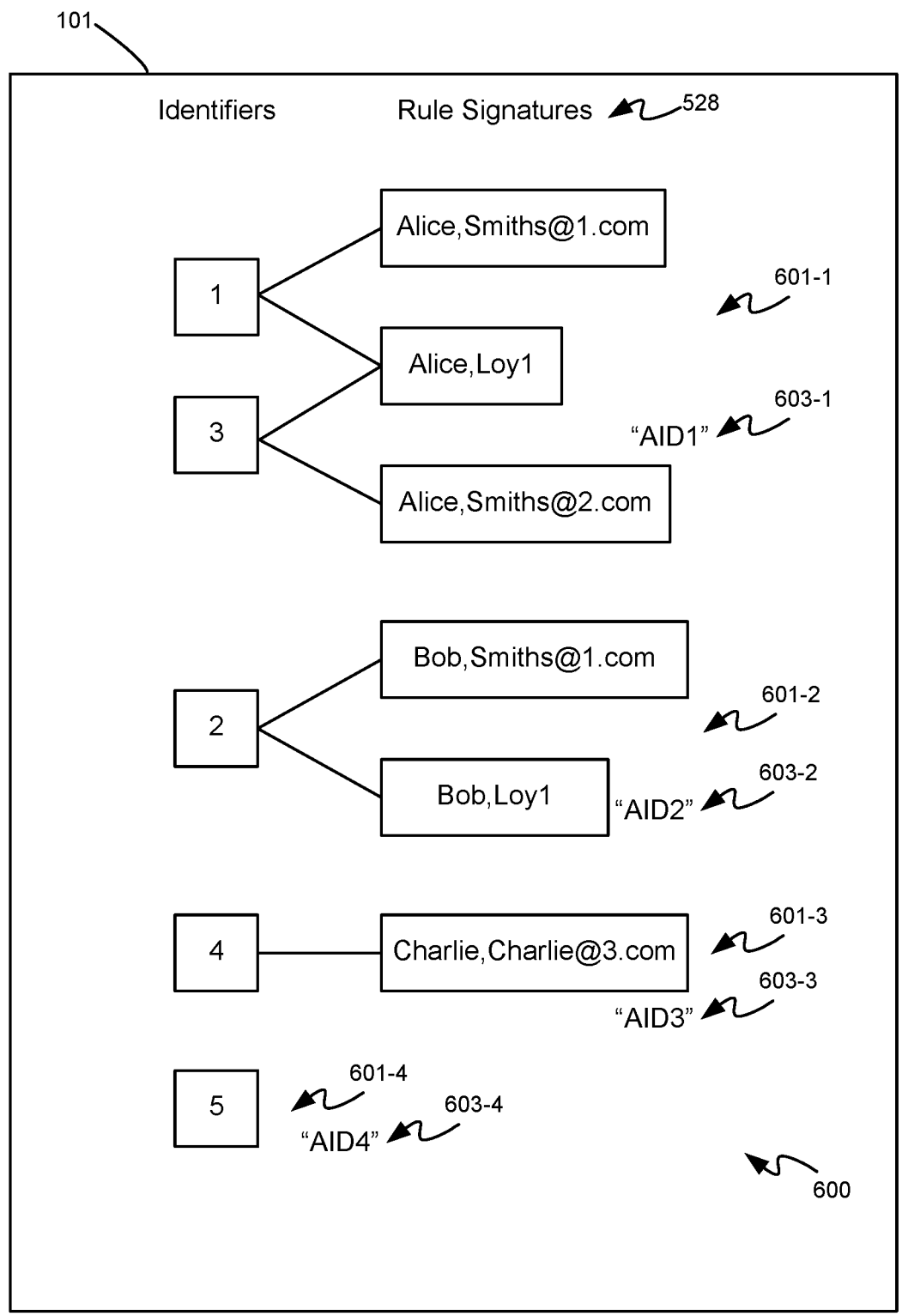
FIG. 6 depicts an example graph, including connected components, that may be generated from the rule signatures using the method for altering a memory using rule signatures and connected components for deduplication, according to non-limiting examples.

Attention is next directed to FIG. 6 which depicts the server 101 implementing an example of the block 306 of the method 300 using the rule signatures 228 generated in the example of FIG. 5. In particular, in FIG. 6, the server 101 is generating (e.g. at the block 306 of the method 300) a graph 600 in a graphical format comprising connected components 601-1, 601-2, 601-3, 601-4 (interchangeably referred to hereafter, collectively, as the connected components 601 and, generically, as a connected component 601) of the plurality of rule signatures 528 and respective identifiers 401. A connected component 601 generally corresponds to a distinct guest of the guest records 104, and a connected component 601 is identified by an assigned identifier. As depicted, the connected components 601-1, 601-2, 601-3, 601-4 are respectively identified by respective assigned identifiers 603-1, 603-2, 603-3, 603-4 interchangeably referred to hereafter, collectively, as the assigned identifiers 603 and, generically, as an assigned identifier 603). In particular, as depicted, the assigned identifier 603-1 comprises text "AID1", the assigned identifier 603-2 comprises text "AID2", the assigned identifier 603-3 comprises text "AID3", and the assigned identifier 603-4 comprises text "AID4".

Furthermore, the graph 600 is at least partially generated by determining pairs of identifiers 401 and rule signatures 528 associated with each other. For example, with brief reference back to FIG. 5, each pair of identifiers 401 and rule signatures 528 determined at the block 304 of the method 300 may correspond to an edge of the graph 600, while each identifier 401 and rule signature 528 correspond to a respective vertex of the graph 600. Hence, for example, the identifier 401 "1" is paired with the rule signature 528-1 "Alice,Loy1" and hence "1" and "Alice,Loy1" are each vertices of the graph 600 and which, together, form an edge of the graph 600. Similarly, the identifier 401 "1" is also paired with the rule signature 528-2 "Alice,Smiths@1.com" and hence "1" and "Alice,Smiths@1.com" are also each vertices of the graph 600 and which, together, form another edge of the graph 600.

Hence, with reference back to FIG. 6, the vertex "1" forms an edge with both vertices "Alice,Loy1", "Alice, Smiths@ 1.com". Similarly, the vertex "3" forms respective edges with both vertices "Alice,Loy1", "Alice, Smiths@2.com", and the vertices "1" and "3" form respective edges with the vertex "Alice,Loy1". However, the vertices "1", "3" "Alice,Loy1", "Alice,Smiths@ 1.com", "Alice,Smiths@2.com" do not form edges with other vertices of the graph 600. Hence, together, the vertices "1", "3" "Alice,Loy1", "Alice,Smiths@1.com", "Alice, Smiths@2.com" and edges formed therebetween, form a first connected component 601-1 of the graph 600, which is assigned an identifier 603-1 "AID1".

Indeed, as there are two vertices of the connected component 601-1 that correspond to two respective identifiers 401 of the guest records 104-1, 104-3, the server 101 may determine that the guest records 104-1, 104-3 are a duplication of each other and/or correspond to one distinct guest.

Similarly, the vertices "2", "Bob,Smiths@1.com", "Bob, Loy1", and edges formed therebetween, form a second connected component 601-2 of the graph 600, which is assigned an identifier 603-2 "AID2".

Similarly, the vertices "4", "Charlie, Charlie @3.com", and an edge formed therebetween, form a third connected component 601-3 of the graph 600, which is assigned an identifier 603-3 "AID3".

As there is one vertex of each of the connected components 601-2, 601-3 that correspond to one respective identifiers 401 of respective guest records 104-2, 104-4, the server 101 may determine that the respective guest records 104-2, 104-4 each correspond to one distinct guest.

Also depicted in FIG. 6 is a lone vertex "5" forms yet a fourth connected component 601-4; the lone vertex "5" is not connected to other vertices, for example as the guest record 104-5 has only a name and no values for the "LoyID" field or the "Email" field, other than null values. As depicted, the fourth connected component 601-4 is assigned an identifier 603-4 "AID4". Similarly, as there is lone vertex in the connected component 601-4, that corresponds to the identifier 401 of the guest records 104-5, the server 101 may determine that the guest record 104-5 corresponds to one distinct guest.

Put another way, each assigned identifier 603 may correspond to one distinct guest in the guest records 104.

While the graph 600 has been described with respect to a graphical format, in other examples, the server 101 may, at the block 306 of the method 300, generate a graph in any suitable format, including, but not limited to, a tabular format. For example, attention is next directed to FIG. 7 which depicts an alternative graph 700 in a tabular format which the server 101 may generate at the block 306. The graph 700 comprises respective lists of edges and vertices determined from the guest records 104 and the rule signatures 228, as described above, which may be grouped as described above into connected components and assigned respective identifiers 603. Indeed, the process for grouping the edges and vertices of the graph 700 into connected components is the same as that described above with respect to the graph 600, but the process is implemented in a tabular format.

Attention is next directed to FIG. 8 which depicts an example of the block 308 of the method 300. In particular, the server 101 has altered the memory 103 to add the assigned identifiers 603 to the guest records 104 that are identified by the respective identifiers 401 associated with one or more respective rule signatures 528 of the connected components 601. Put another way, a respective assigned identifier 603 is added to each of the guest records 104 that include a vertex of a respective connected component 601. Hence, for example, as the connected component 601-1 includes vertices from the guest records 104-1, 104-3, the assigned identifier 603-1 "AID1" is added to the guest records 104-1, 104-3, for example in a new column "AID" of the guest records 104, indicating that the guest records 104-1, 104-3 are associated with a same distinct person. Hence, identifying the guest records 104-1, 104-3 via the same assigned identifier 603-1 "AID1" results in a deduplication of the guest records 104-1, 104-3 and/or an identification of guest records 104 that are duplicated for one distinct guest.

Similarly, as the connected component 601-2 includes vertices from the guest record 104-2, the assigned identifier 603-2 "AID2" is added to the guest record 104-2, for example in the new column "AID" of the guest records 104. However, as the assigned identifier 603-2 "AID2" is added to only the guest record 104-2, it is understood that there is no duplication of information in the guest records 104 for the guest associated with the guest record 104-2.

Similarly, as the connected component 601-3 includes vertices from the guest record 104-4, the assigned identifier 603-3 "AID3" is added to the guest record 104-4, for example in the new column "AID" of the guest records 104. However, as the assigned identifier 603-3 "AID3" is added to only the guest record 104-3, it is understood that there is no duplication of information in the guest records 104 for the guest associated with the guest record 104-3.

Similarly, as depicted, as the connected component 601-4 includes the vertex from the guest record 104-5, the assigned identifier 603-4 "AID4" is added to the guest record 104-5, for example in the new column "AID" of the guest records 104. However, as the assigned identifier 603-4 "AID4" is added to only the guest record 104-5, it is understood that there is no duplication of information in the guest records 104 for the guest associated with the guest record 104-5.

Hence, it is further understood that as there are four assigned identifiers 603 (e.g. four connected components 601), the five guest records 104 represent four guests and not five guests. Hence, the memory 103, as altered, better defines a number of distinct guests represented by the guest records 104.

Furthermore, as depicted, the memory 103 may be altered to include links 803 between guest records 104 that are identified via common assigned identifiers 603 and/or associated via a common assigned identifier 603. In particular, as the guest records 104-1, 104-3 are associated via a common assigned identifier 603 "AID1" (e.g. the guest records 104-1, 104-3 are associated with the same distinct guest), in a new column "LINK", the memory 103 is altered to include respective links 803 between the guest records 104-1, 104-3. For example, the guest record 104-1 is altered to include a link "LINK3" which, when the guest record 104-1 is retrieved by a computing device (such as the computing device 115) and actuated, may cause the guest record 104-3 to be retrieved. Similarly, the guest record 104-3 is altered to include a link "LINK3" "LINK1" which, when the guest record 104-3 is retrieved by a computing device (such as the computing device 115) and actuated, may cause the guest record 104-1 to be retrieved.

However, including such links 803 (e.g. in a link column) represents only one example of how guest records 104 that share a same assigned identifier 603 may be linked together. For example guest records 104 that share a same assigned identifier 603 may be not be linked via the depicted links 803. Rather guest records 104 that share a same assigned identifier 603 may be recalled via a database lookup, and the like, using an assigned identifier 603.

Figure 9:
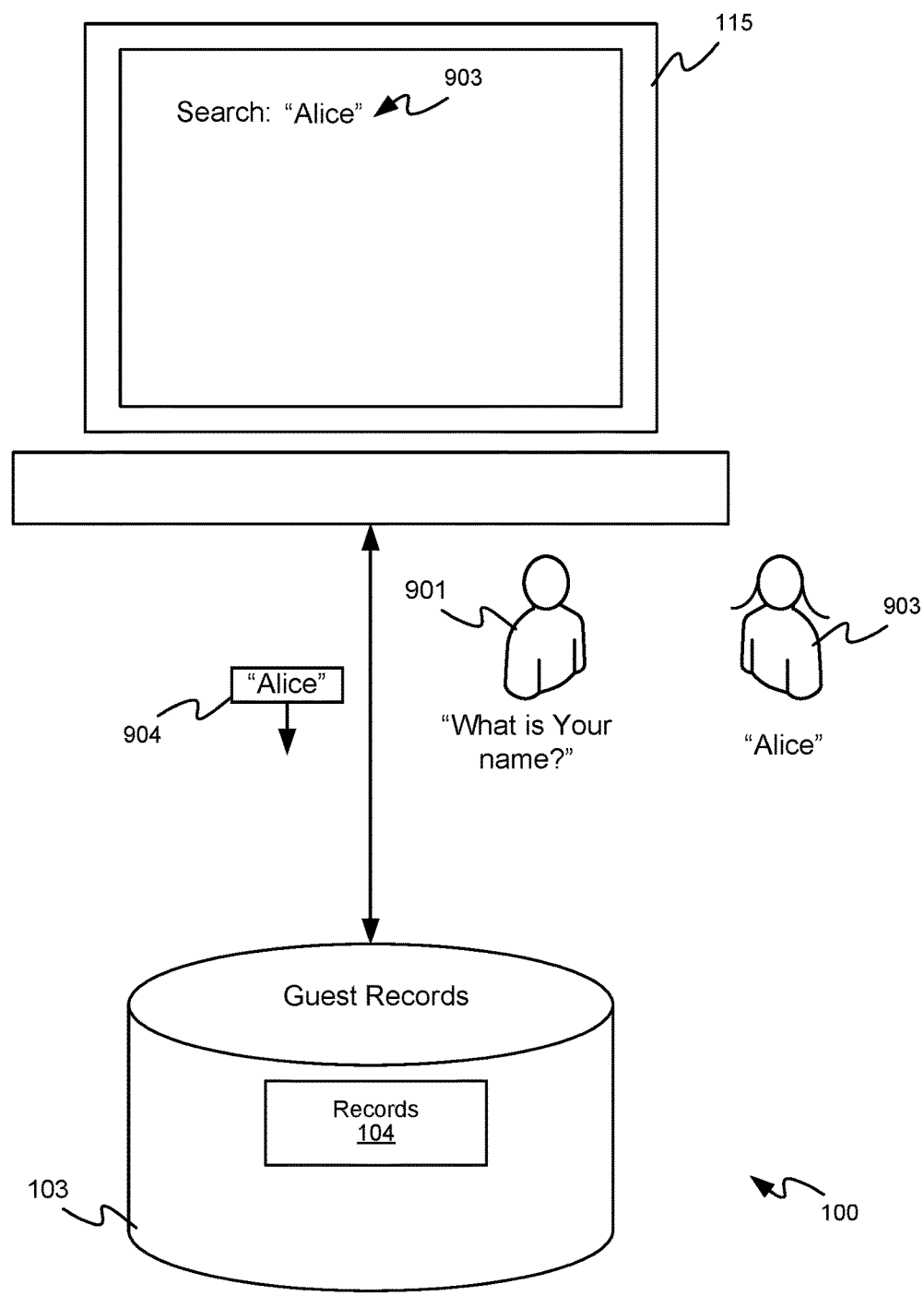
FIG. 9 depicts a first portion of an example of the altered memory being used to make record recall more efficient, according to non-limiting examples.
Figure 10:
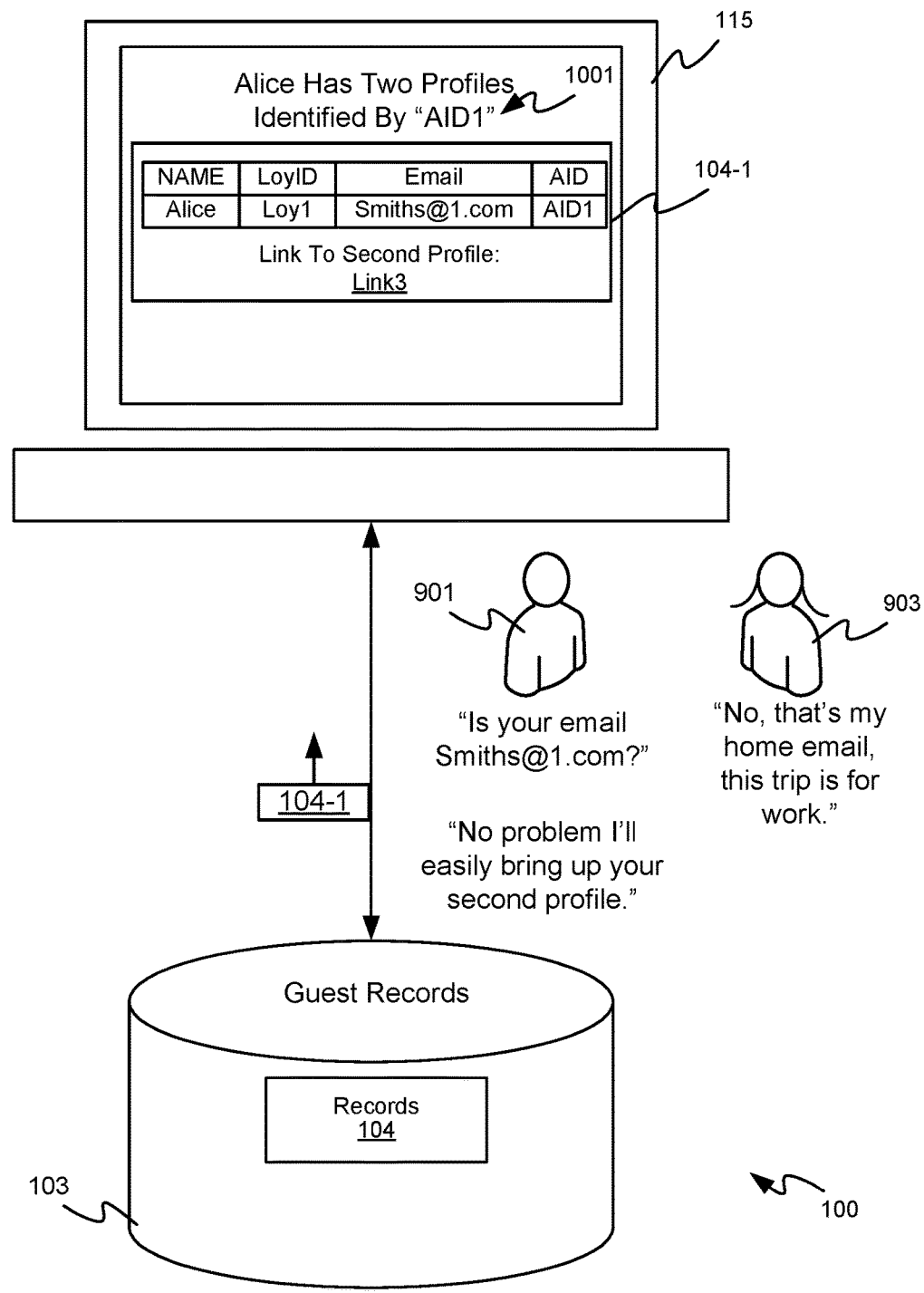
FIG. 10 depicts a second portion of the example of the altered memory being used to make record recall more efficient, according to non-limiting examples.
Figure 11:
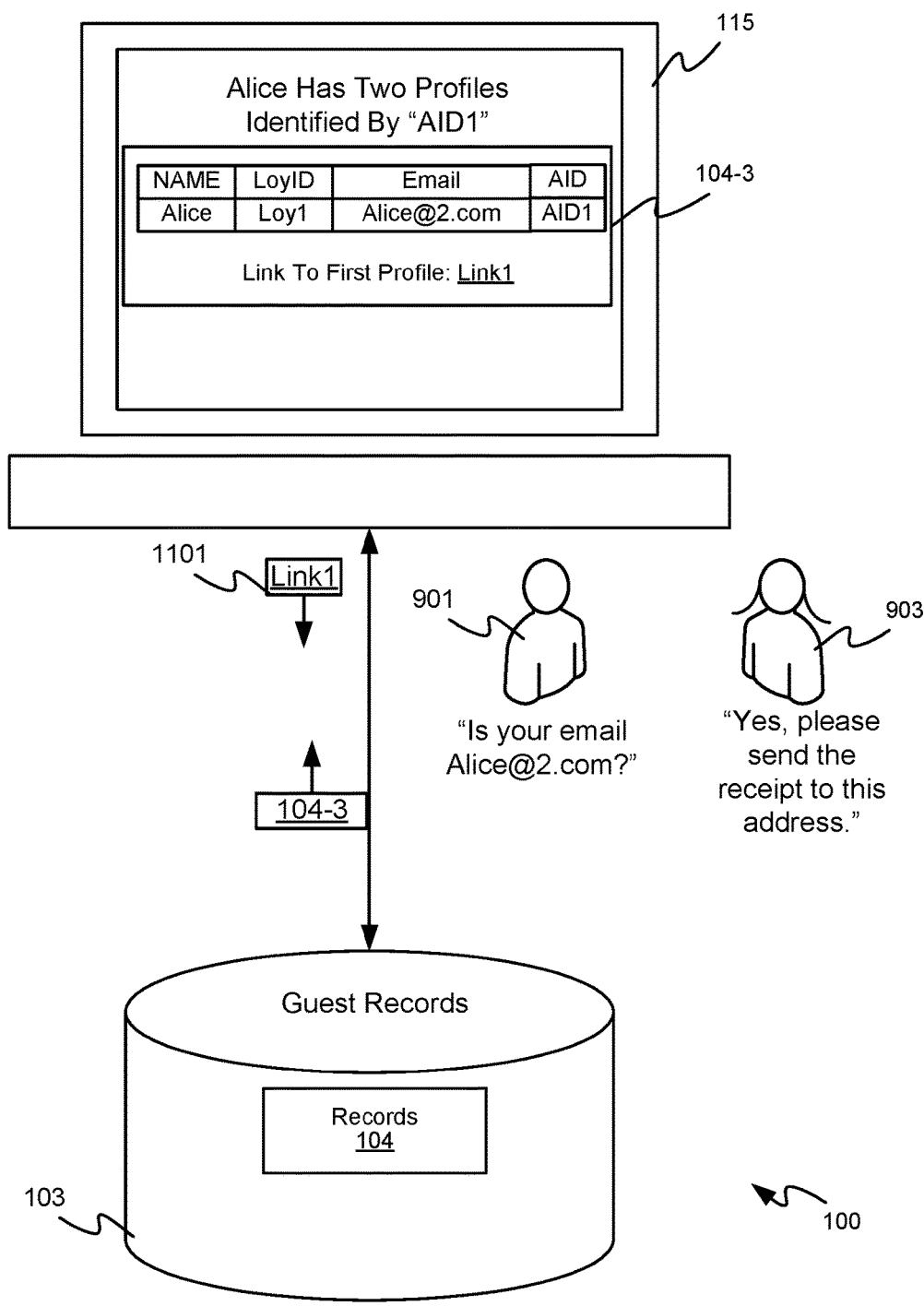
FIG. 11 depicts a third portion of the example of the altered memory being used to make record recall more efficient, according to non-limiting examples.

For example, attention is next directed to FIG. 9, FIG. 10 and FIG. 11 which depict a portion of the system 100, and in particular the computing device 115 and the memory 103 as altered after the implementation of the method 300. While other components of the system 100 are not depicted, they are understood to be present. In particular, FIG. 9, FIG. 10 and FIG. 11 depict an example of how altering the memory 103, using the method 300, may result in operation of the system 100 becoming more efficient.

As depicted, the computing device 115 is being operated by a user 901, who is speaking with a guest 903, who may be attempting to check-in to a service being provided by an entity associated with the system 100. The user 901 inquires as to the name of the guest 903 (e.g. by asking "What is your name?"), and the guest 903 replies "Alice". The user 901 may then operate the computing device 115 to enter the name "Alice" into search field 903 provided at a display screen of the computing device 115, which may cause the computing device 115 to search for guest records 104 at the memory 103 (e.g. in a database lookup), that may include the name "Alice" via a search string 904.

With reference to FIG. 10, the search of the memory 103 may return only the first guest record 104-1 that includes the name "Alice" (e.g. which, as depicted, represents a personal profile of the guest 903) which is then rendered at the display screen of the computing device 115. As depicted, the guest record 104-1, as rendered, includes the link "Link3" to the other guest record 104-3 associated with the same assigned identifier 603-1 "AID1". In some examples, the link "Link3" may be from the column of links 803, while in other examples the link "Link3" may be generated by the device 115 based on the assigned identifier 603-1 "AID1" and/or using a database lookup of the guest records 104 using the assigned identifier 603-1 "AID1". While as depicted, the assigned identifier 603-1 "AID1" is rendered at the display screen of the computing device 115, in other examples, the assigned identifier 603-1 "AID1" may not be rendered at the display screen of the computing device 115. Furthermore, an indication 1001 that the name "Alice" is associated with two guest records 104 is provided (e.g. "Alice Has Two Profiles Identified By "AID1").4

As depicted, the user 901 asks the guest 903 to confirm the email address in the guest record 104-1 (e.g. by asking "Is your email Smiths@1.com?"), and the guest 903 replies that she is on a work trip and that the email address in the guest record 104-1 is her home email. As the user 901 may easily actuate the link "Link3", the user 901 may easily access the other guest record 104-3 of the guest 903. Alternatively, the user 901 may perform another search for guest records 104 associated with the assigned identifier 603-1 "AID1".

However, as depicted in FIG. 11, actuation of the link "LINK3", and the like, may be used to transmit a request 1101 to the memory 103 for the guest record 104-3, which is returned and rendered at the display screen of the computing device 115. The user 901 asks the guest 903 to confirm the email address in the guest record 104-3 (e.g. by asking "Is your email Alice@2.com?"), and the guest 903 confirms the email address (e.g. and asks that the receipt for the service be emailed to this email address). Hence, the user 901 may easily access various profiles of the guest 903 without having to perform additional searches and/or sort through a plurality of guest records 104-1, 104-3 that may include the name "Alice".

In other examples, the search of FIG. 9 may return all the guest records 104-1, 104-3 that may include the name "Alice", but the common assigned identifier 603-1 may be rendered at the guest records 104-1, 104-3, at the display screen of the computing device 115, which may allow the user 901 to easily identify both of the guest records 104-1, 104-3 as being associated with the guest 903. Alternatively, the guest records 104-1, 104-3 may be returned and rendered at the display screen of the computing device 115 with an information indicating that both of the guest records 104-1, 104-3 are associated with the guest 903 (e.g. similar to the indication 1001).

Regardless, altering the memory 103 to add the assigned identifiers 603 to the guest records 104, and optionally the links as described above, may enable the computing device 115 to more easily identify guest records 104 that are associated with distinct guests, obviating use of processing resources and/or bandwidth resources in the system 100 to, for example, perform further searching that may occur in the absence of the assigned identifiers 603 (and optionally in the absence of the links). For example, in the absence of the assigned identifiers 603 (and optionally in the absence of the links), the user 901 may have to perform further searching to find the guest record 104-3 that corresponds to the work profile for the guest 903, for example by asking the guest 903 for their work email address to use the work email address to search the guest records 104. Indeed, in a situation where the guest 903 cannot recall their work email address then finding the guest record 104-3 that corresponds to the work profile for the guest 903 may be challenging in presence of duplicate guest records 104 for the guest 903; a similar situation may occur when the guest 903 is associated with duplicate guest records 104 with different loyalty program numbers (e.g. a personal loyalty program number, and a work loyalty program number) and the guest 903 cannot recall any of the loyalty program numbers (e.g. which tend to be long random strings of alphanumeric text that are used infrequently and hence tend to be challenging for a human to remember).

Figure 12:
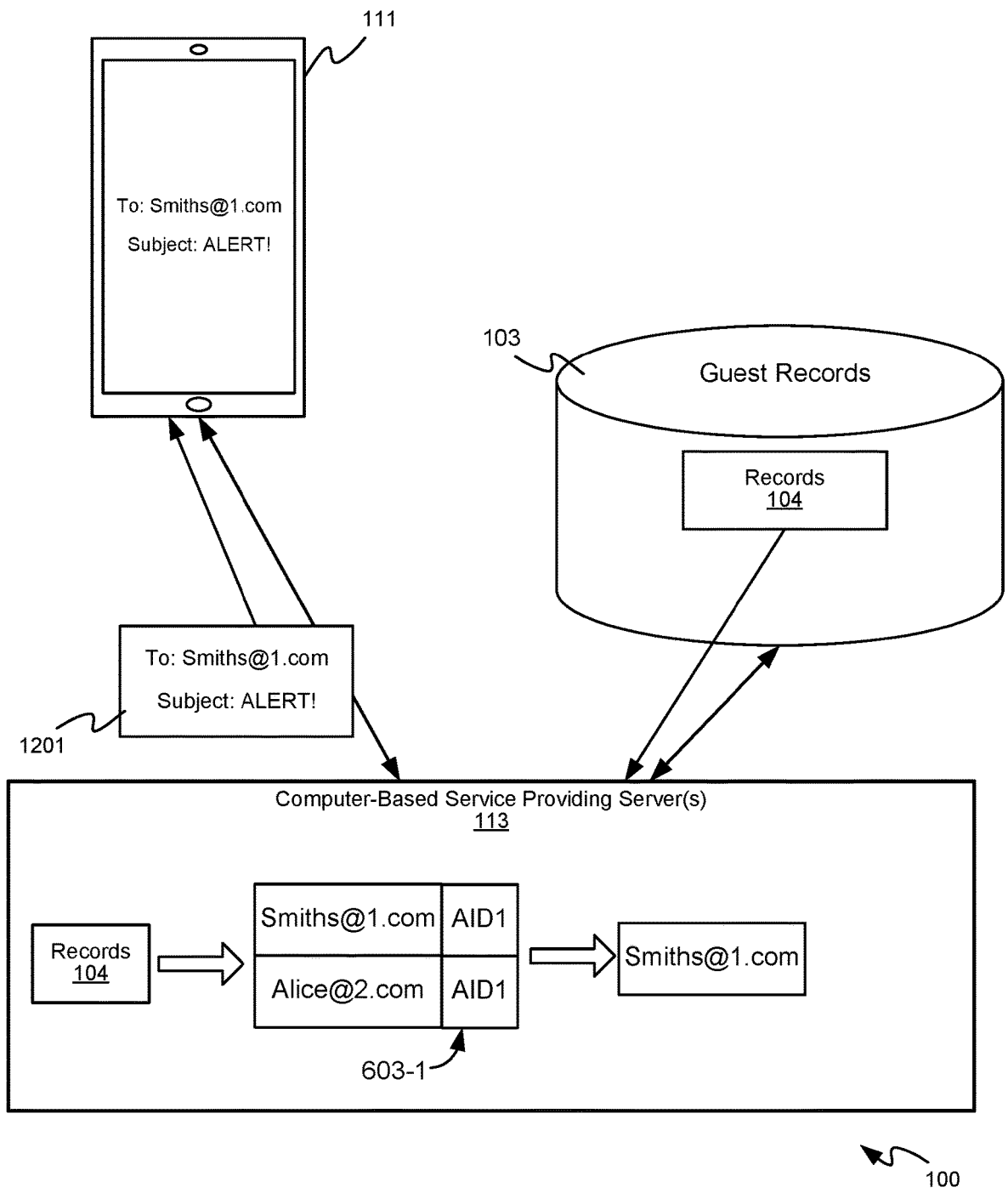
FIG. 12 depicts an example of the altered memory being used to make message generation and transmission efficient, according to non-limiting examples.

Attention is next directed to FIG. 12 which depict a portion of the system 100, and in particular the communication device 111, the computer-based service providing server 113, and the memory 103 as altered after the implementation of the method 300. While other components of the system 100 are not depicted, they are understood to be present. In particular, FIG. 12 depicts another example of how altering the memory 103, using the method 300, may result in operation of the system 100 becoming more efficient.

In particular, it is understood in the example of FIG. 12 that the server 113 is generally configured to generate messages (e.g. email) to guests represented by the guest records 104, and is further generally configured to generate one message per distinct guest represented by the guest records 104 (e.g. for a particular message) based on, for example, the assigned identifiers 603. It is further understood in the example of FIG. 12 that the communication device 111 may receive emails for the distinct guest represented by the guest records 104-1, 104-3.

In particular, as depicted, the server 113 is retrieving the guest records 104 from the memory 103 to generate a message to the distinct guests represented by the guest records 104. As depicted, the server 113 determines that two email addresses (e.g. "Smiths@1.com" and "Alice@2.com") are associated with the assigned identifier 603-1 "AID1". As such, the server 113 selects one of the email addresses (e.g. as depicted "Smiths@1.com"), and generates and transmits a message 1201 (e.g. an email) to the selected email address. While the depicted example shows the server 113 messaging only the communication device 111, it is understood that the server 113 generally messages other communication devices of other distinct guests represented by the guest records 104 (e.g. of the memory 103 as altered) using the assigned identifiers 603 to determine email addresses of distinct guests.

It is further understood that in the absence of the assigned identifiers 603 the server 113 would message all the email addresses of the guest records 104 resulting, for example, in two messages to the communication device 111 (e.g. one to each of "Smiths@1.com" and "Alice@2.com") thereby wasting processing resources of the server 113 in generating both messages as well as wasting bandwidth resources in transmitting both messages; indeed, further processing and bandwidth resources would be wasted at the communication device 111 in receiving and processing both of the messages. Furthermore, transmitting both messages may result in the messages being identified as spam, and the like, for example by a spam-filtering application at the communication device 111 and/or by a guest operating the communication device 111; in the former example, the guest may not be provided with the messages as the spam-filtering application may move the messages to a spam folder, and the like, and in the latter example the guest may ignore the messages. Hence, altering of the memory 103 using the method 300 may generally result in a reduction of processing and bandwidth resource usage in the system 100 and/or better ensure that a guest operating the communication device 111 views a message.

It is further understood that while, in the depicted examples, two matching rules 228 are applied to the guest records 104, as few as one matching rule 228 may be applied to the guest records 104, and more than two matching rules 228 may be applied to the guest records 104. Furthermore, while particular types matching rules 228 are depicted, which both use the field "NAME", other types of matching rules 228 are within the scope of the present specification, and which may depend on the fields of the guest records 104.

Furthermore, the types of matching rules 228 used with the method 300 may be determined heuristically and/or using machine learning algorithms, and the like. For example, using the example guest records 104 of FIG. 4, a matching rule 228 that included only information from the "LoyID" fields and the "Email" fields may not be effective at determining duplications unless used in conjunction with other matching rules 228 (e.g. that use the "NAME" field). Hence, a number and type of matching rules 228 to apply at the block 304 of the method 300 may be determined by using example matching rules 228 and applying a ground truth (e.g. a known number of guests associated with the guest records 104) to confirm the effectiveness of the matching rules 228 and/or to validate the matching rules 228. One such validation scheme that uses the one or more validated rules 238 is described hereafter. For conciseness, the one or more validated rules 238 are referred to hereafter as the validated rules 238.

Figure 13:
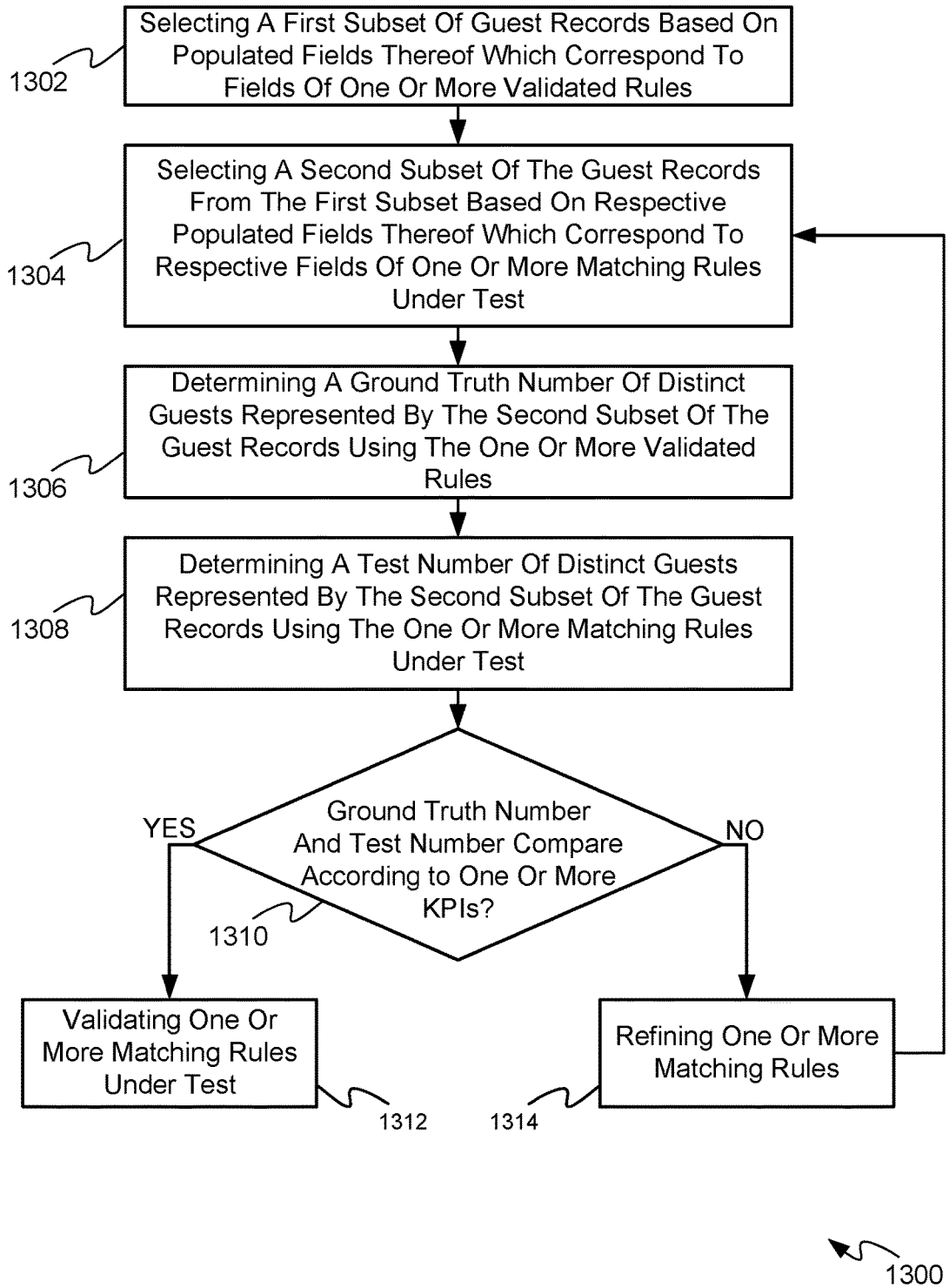
FIG. 13 depicts a method for validating matching rules, according to non-limiting examples.

For example, attention is now directed to FIG. 13 which depicts a flowchart representative of a method 1300 for validating matching rules 228. The operations of the method 1300 of FIG. 13 correspond to machine readable instructions that are executed by the server 101, and specifically the controller 220 of the server 101. In the illustrated example, the instructions represented by the blocks of FIG. 13 may be stored at the memory 224 for example, as a component of the application 227. The method 1300 of FIG. 13 is another way in which the controller 220 and/or the server 101 and/or the system 100 may be configured. Furthermore, the following discussion of the method 1300 of FIG. 13 will lead to a further understanding of the system 100, and its various components.

The method 1300 of FIG. 13 need not be performed in the exact sequence as shown and likewise various blocks may be performed in parallel rather than in sequence. Accordingly, the elements of method 1300 are referred to herein as "blocks" rather than "steps." The method 1300 of FIG. 13 may be implemented on variations of the system 100 of FIG. 1, as well.

It is furthermore understood that the method 1300 may be implemented before and/or after implementation of the method 300 and/or in conjunction with the method 300.

For example, the method 1300 may be implemented before the method 300 to validate and/or refine the matching rules 228 prior to implementation of the method 300. However, the method 1300 may be implemented after the method 300 to validate and/or refine the matching rules 228 after implementation of the method 300 and/or during implementation of the method 300.

At a block 1302, the controller 220 and/or the server 101 selects a first subset of the guest records 104 based on populated fields thereof which correspond to fields of one or more validated rules 238. In some examples, the block 1302 may further include excluding outlier guest records 104 (as described in detail above) from the first subset.

For example, the validated rules 238 may comprise "highly trustable" and/or validated rules which may be similar to the matching rules 228 as described above. However, in comparison, the validated rules 238 generally include fields which, when applied to a subset of the guest records 104 that also include populated fields corresponding to the fields of the validated rules 238, an accurate number of distinct guests of the subset are determined. The validated rules 238 may be determined heuristically, through trial and error, and the like. Given examples of the validated rules 238 may include, but are not limited to the following: a first validated rule 238 may include fields for a first name, last name, email address and home phone number of a guest; a second validated rule 238 may include fields for a first name, last name, email address and home address of a guest; a third validated rule 238 may include fields for a first name, last name, home phone number and home address of a guest; a fourth validated rule 238 may include fields for a first name, last name, birthday and home phone number of a guest; a fourth validated rule 238 may include fields for a first name, last name, birthday and home address of a guest; a fifth validated rule 238 may include fields for a first name, last name, birthday and email address of a guest; and the like. Indeed, the fields of the validated rules 238 may be selected such that the combination of fields resulting in distinctly identifying guests of the guest records 104. While the fields of the validated rules 238 may include fields that are also in the matching rules 228, the validated rules 238 may generally (e.g. but not always) include more fields and/or a larger number of fields than the matching rules 228.

Hence, at the block 1302, the controller 220 and/or the server 101 compares the fields of the validated rules 238 with the fields of the guest records 104 and selects the first subset of the guest records 104 by selecting guest records 104 that include populated fields corresponding to the fields of the validated rules 238. Hence, for example, when a validated rule 238 includes fields for a first name, last name, home phone number and home address of a guest, then all the guest records 104 in the first subset have a populated first name, a populated last name field, a populated phone number field and a populate home address field; if a given guest record 104 includes these fields, but one or more of the fields are not populated (which includes, but is not limited to, a "NULL" value), the given guest record 104 is not included in the subset.

At a block 1304, the controller 220 and/or the server 101 selects a second subset of the guest records 104 from the first subset based on respective populated fields thereof which correspond to respective fields of one or more matching rules 228 under test. For example, similar to the block 1302, the controller 220 and/or the server 101 compares the fields of the matching rules 228 under test with the fields of the first subset of the guest records 104, and selects the second subset of the guest records 104 by selecting guest records 104 of the first subset that include populated fields corresponding to the fields of the matching rules 228 under test. Hence, all the fields of the second subset that correspond to the fields of both the validated rules 238 and the matching rules 228 under test are populated. For conciseness, the one or more matching rules 228 under test are referred to hereafter as the matching rules 228 under test.

At a block 1306, the controller 220 and/or the server 101 determines a ground truth number of distinct guests represented by the second subset of the guest records 104 using the validated rules 238. For example, as mentioned above, the validated rules 238 have been previously validated such that when applied to a subset (e.g. the first subset of the block 1302 and/or the second subset of the block 1304) of the guest records 104 that also include populated fields corresponding to the fields the validated rules 238, an accurate number of distinct guests of the subset are determined. Hence, at the block 1306 the validated rules 238 may be applied to the second subset in a manner similar to as described above in the method 300 with respect to applying the matching rules 228 to the guest records 104. It is understood that a ground truth number of distinct guests represented by the second subset of the guest records 104 comprises an estimated accurate number of the distinct guests. Hereafter, for conciseness, the terms "ground truth number of distinct guests" and "ground truth number" will be used interchangeably; hence, unless otherwise stated, the term "ground truth number" is understood to mean "ground truth number of distinct guests".

For example, the ground truth number may comprise a number of assigned identifiers (similar to the assigned identifiers 603) and/or a number of connected components (similar to the connected components 601) of a graph (e.g. similar to the graph 600 and/or the graph 700) generated from the second subset of the guest records 104 using the validated rules 238. In general, a graph generated from the second subset of the guest records 104 will not include lone vertices as the fields of the second subset of the guest records 104, that correspond to the fields of the validated rules 238 (and to which the validated rules 238 are applied), are populated.

At a block 1308, the controller 220 and/or the server 101 determines a test number of distinct guests represented by the second subset of the guest records 104 using matching rules 228 under test, for example as described above with respect to the method 300. Hereafter, for conciseness, the terms "test number of distinct guests" and "test number" will be used interchangeably; hence, unless otherwise stated, the term "test number" is understood to mean "test number of distinct guests".

For example, the test number may comprise a number of assigned identifiers (similar to the assigned identifiers 603) and/or a number of connected components (similar to the connected components 601) of a graph (e.g. similar to the graph 600 and/or the graph 700) generated from the second subset of the guest records 104 using the matching rules 228 under test. In general, a graph generated from the second subset of the guest records 104 will not include lone vertices as the fields of the second subset of the guest records 104, that correspond to the fields of the matching rules 228 under test (and to which the matching rules 228 under test are applied), are populated.

At a block 1310, the controller 220 and/or the server 101 compare the ground truth number and the test number according to one or more key performance indicators (KPIs) to determine whether the ground truth number and the test number are the same or different, and/or whether the test number meets one or more KPIs based on a comparison with the ground truth number, for example using thresholds as described below.

For example, when the test number and the ground truth number are the same (e.g. the test number equals the ground truth number) and/or the test number meets one or more KPIs based on a comparison with the ground truth number, a "YES" decision occurs at the block 1310 and the controller 220 and/or the server 101, at a block 1312, validates matching rules 228 under test. For example, such a validation indicates that presently matching rules 228 under test are relatively accurate and may be used to continue to implement the method 300.

However, when the test number and the ground truth number are different (e.g. the test number does not equals the ground truth number) and/or the test number does meets one or more KPIs based on a comparison with the ground truth number, a "NO" decision occurs at the block 1310 and the controller 220 and/or the server 101, at a block 1314, refines matching rules 228 under test and repeats the method 1300 from the block 1304 (as depicted) or the method 1300 may be repeated from the block 1302. For example, a "NO" decision at the block 1310 indicates that presently matching rules 228 under test are not accurate and are preferably refined to increase accuracy. Such refinements may include, but are not limited to, adding fields to existing matching rules 228 under test, changing fields of existing matching rules 228 under test, adding new matching rules 228 (e.g. to the existing matching rules 228 under test), removing matching rules 228 (e.g. from the existing matching rules 228 under test), and the like. Such refinement may occur using machine learning algorithms, and the like, trained to refine matching rules.

Furthermore, such refinement may depend on whether the test number is larger or smaller than the ground truth number. For example, when the test number is smaller than the ground truth number, the matching rules 228 under test result in one or more false positive identifications of distinct guests of the second subset of the guest records 104; hence, in these examples, the matching rules 228 may be refined to reduce the number of false positives, for example by adding more fields to one or more of the matching rules 228, and/or by adding one or more matching rules 228. Similarly, when the test number is larger than the ground truth number, the matching rules 228 under test result in one or more false negative identifications of distinct guests of the second subset of the guest records 104; hence, in these examples, the matching rules 228 may be refined to reduce the number of false negatives, for example by removing fields from one or more of the matching rules 228 under test, and/or by removing one or more matching rules 228 under test.

Example of various KPIs are next described.

For example, an "Efficiency" KPI may be determined from the following equation:

$$\text{Efficiency} = 1 - \left[ \frac{|GTN - \text{Test Number}|}{(\text{Number of Guests Before Deduplication})} \right] \quad \text{Equation (1)}$$

In Equation (1), and hereafter, "GTN" refers to the ground truth number. In general, the denominator of Equation (1) indicates a number of guests represented in the guest records 104 before deduplication (hereafter, "NOGBDD"). In general, the lower the efficiency, the poorer the match between the test number and the ground truth number. In some examples, at the block 1310, the controller 220 and/or the server 101 may determine the efficiency using Equation (1) and compare the determined efficiency to a threshold efficiency, for example "0.95" and/or any other suitable value. When the determined efficiency is greater than (or equal to) the threshold efficiency, the controller 220 and/or the server 101 may determine that the test number meets a KPI and a "YES" decision occurs at the block 1310, as described above, and the matching rules 228 under test are validated at the block 1312, as described above. Otherwise the matching rules 228 under test are adjusted at the block 1314; a degree and/or amount of refinement may depend on the value of the efficiency, with more refinement occurring, the lower the efficiency.

In another example, a "Bias" KPI may be determined from the following equation:

$$\text{Bias} = \left[ \frac{(GTN - \text{Test Number})}{(NOGBDD)} \right] \quad \text{Equation (2)}$$

A bias of "0" occurs when the test number equals the ground truth number. However a negative bias occurs when the test number is larger than the ground truth number, and a positive bias occurs when the test number is smaller than the ground truth number. In some examples, at the block 1310, the controller 220 and/or the server 101 may determine the bias using Equation (2) and compare the determined bias to threshold biases and/or a threshold bias range, for example "−0.05 to +−0.05" and/or any other suitable values and/or ranges. When the determined bias is within the threshold bias range, the controller 220 and/or the server 101 may determine that the test number meets a KPI and a "YES" decision occurs at the block 1310, as described above, and the matching rules 228 under test are validated at the block 1312, as described above.

However, when the determined bias is outside the threshold bias range, the controller 220 and/or the server 101 may determine that the test number does not meets a KPI and a "NO" decision occurs at the block 1310, as described above. The refinement of the matching rules 228 under test, which occurs at the block 1314, may depend on whether the bias is positive or negative (e.g. whether the test number is smaller or larger than the ground truth number, as described above).

In another example, an "Accuracy" KPI may be determined from the following equation:

$$\text{Accuracy} = 1 - \left[ \frac{GTN - ((\text{Test Number})OR(GTN))}{(NOGBDD)} \right] \quad \text{Equation (3)}$$

In Equation (3), the term (Test Number)OR(GTN) refers to a determination of a number of distinct guests by using an OR function when applying both the matching rules 228 under test and the validated rules 238 to the second subset of the guest records 104.

For example, a respective distinct guest determined using such an OR function may correspond to a respective group of the second subset of the guest records 104 that meet both the matching rules 228 under test and the validated rules 238.

Figure 14:
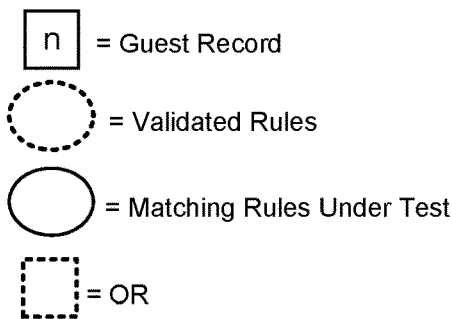
FIG. 14 depicts an example of a key performance indicators that may be used to validate matching rules, according to non-limiting examples.
Figure 14:
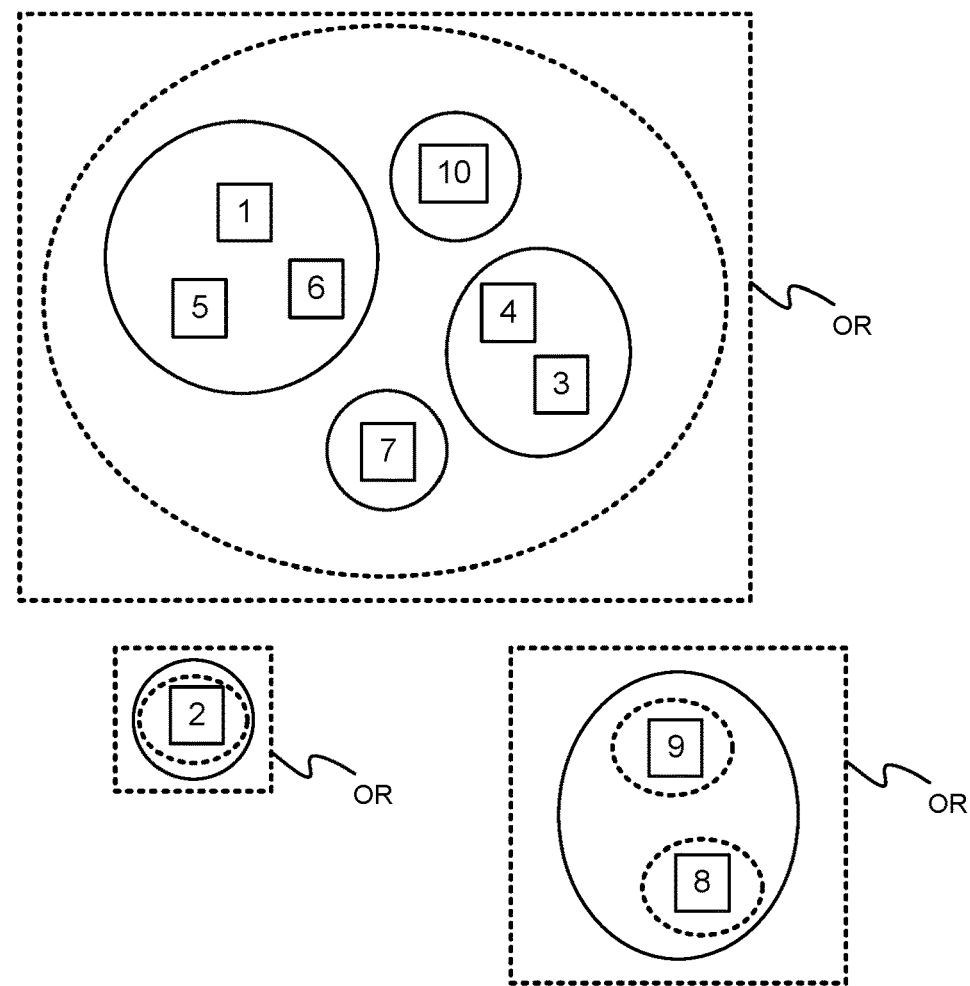

For example, such an OR function is depicted graphically in FIG. 14 (e.g. as a Venn Diagram). In particular: solid boxes with a number therein correspond to guest records 104 of the second subset (e.g. in the example of FIG. 14, 10 ("ten") guest records in the second subset are depicted); ellipses formed from broken lines correspond to the validation rules 238 being applied to the guest records 104, with guest records 104 inside an ellipse with a broken line all associated with a distinct guest when the validation rules 238 are applied to the second subset; ellipses formed from solid lines correspond to the matching rules 228 under test being applied to the guest records 104, with guest records 104 inside an ellipse with a solid line all associated with a distinct guest when the matching rules 228 under test are applied to the second subset; and boxes formed from broken lines correspond to the above described OR function.

Hence, for example, when the validation rules 238 are applied to the second subset, the guest records 1, 3, 4, 5, 6, 7 and 10 all correspond to a first distinct guest, and the guest records 4, 8 and 9 all respectively correspond to a three further distinct guests; put another way, the ground truth number depicted in FIG. 14 is "4".

Similarly, example, when the matching rules 228 under test are applied to the second subset, the guest records 1, 5, 6 all correspond to a first distinct guest, the guest records 3, 4 all correspond to a second distinct guest, the guest records 8, 9 all correspond to a third distinct guest, and the guest records 2, 7 and 10 all respectively correspond to a three further distinct guests; put another way, the test number depicted in FIG. 14 is "6".

However, when the above described "OR" function is applied to the guest records of FIG. 14, for example as indicated by the solid boxes labelled "OR", the guest records 1, 3, 4, 5, 6, 7 and 10 all correspond to a first distinct guest (e.g. as the guest records 1, 3, 4, 5, 6, 7 and 10 are all grouped according to both the validation rules 238 and the matching rules 228 under test), the guest records 8 and 9 all correspond to a second distinct guest (e.g. as the guest records 8 and 9 are all grouped according to both the validation rules 238 and the matching rules 228 under test), and the guest record 2 corresponds to a third distinct guest (e.g. as the guest record 2 is grouped according to both the validation rules 238 and the matching rules 228 under test). Put another way, the number of distinct guests determined from the OR function in FIG. 14 is "3", the number of distinct guests determined from the validated rules 238 is "4", and the number of distinct guests determined from the matching rules 228 under test is "6".

Returning to Equation (3), an accuracy of "1" occurs when the test number equals the ground truth number (e.g. when the number of distinct guests determined by using an OR function when applying both the matching rules 228 under test and the validated rules 238 to the guest records). However, the lower the accuracy, the poorer the match between the test number and the ground truth number. In some examples, at the block 1310, the controller 220 and/or the server 101 may determine the accuracy using Equation (3) and compare the determined accuracy to a threshold accuracy, for example "0.95" and/or any other suitable value. When the determined accuracy is greater than (or equal to) the threshold efficiency, the controller 220 and/or the server 101 may determine that the test number meets a KPI and a "YES" decision occurs at the block 1310 and the matching rules 228 under test are validated at the block 1312, as described above. Otherwise the matching rules 228 under test are adjusted at the block 1314. A degree and/or amount of refinement may depend on the value of the accuracy, for example, the lower the initial accuracy, the more refinement may be applied to increase the accuracy.

However the above KPIs may be used together to "interpret" performance of the matching rules 228 under test. For example, "Efficiency" (Equation (1)) may be used to determine how efficient the matching rules 228 under test are performing, overmatching (false positives) or undermatching (false negatives), and degree thereof, may be determined using "Bias" (Equation (2)), and accuracy of the matching rules 228 under test may be determined from the "Accuracy" (Equation (3)). Furthermore, machine learning algorithms may be trained to adjust the matching rules 228 based on the above KPIs (or any suitable KPIs), and/or to test the matching rules 228 at any suitable time and/or on an ongoing basis (including, but not limited to, during implementation of the method 300) and/or as guest records 104 are added to and/or changed and/or increased and/or decreased.

Furthermore, feedback may be used to improve the refinement of the matching rules 228. For example, with brief reference back to FIG. 9, FIG. 10 and FIG. 11, when the user 901 reviews the guest records 104-1, 104-3 retrieved, the user 901 may provide feedback to the server 101 as to whether or not the guest records 104-1, 104-3 are associated with the same distinct guest, or not (e.g. by filling in a form, interacting with menu system, and the like, at the computing device 115). Machine learning algorithms at the server 101 may receive such feedback and adjust the matching rules 228 accordingly, and further cause the method 1300 to be implemented to test the adjusted matching rules 228.

While certain KPIs are described, any suitable KPI is within the scope of the present specification. For example a KPI based on respective numbers of false positives, false negatives, true positives and true negatives may be used. For example, attention is next directed to FIG. 15, which depicts relationships between pairs of four example guest records 104 "1", "2", "3", "4" (referred to hereafter with reference to FIG. 15 as guest records "1", "2", "3", "4"), grouped according to the validated rules 238 and the matching rules 228 under test. Hence, in the example of FIG. 15, it is understood that only four guest records 104 are in the second subset of the method 1300.

In particular a solid line between two of the guest records "1", "2", "3", "4" indicates that they each represent a same distinct guest according to the validated rules 238, a broken line between two of the guest records "1", "2", "3", "4" indicates that they each represent a same distinct guest according to the matching rules 228 under test, and a bracket indicating two of the guest records "1", "2", "3", "4" indicates that they are not grouped according to the matching rules 228 under test. Hence, by comparing the relationships therebetween, numbers of false positives, false negatives, true positives and true negatives may be determined.

For example, when the validated rules 238 and the matching rules 228 under test are used to group the guest records 104, the groupings that occur via the validated rules 238 may be understood to be accurate. True positives, true negatives, false positives and false negatives may be determined by comparing pairs of the guest records 104 and whether the pairs are associated with a same distinct guest according to the validated rules 238 and the matching rules 228 under test. Hence, a true positive occurs when a pair of the guest records 104 are determined to be associated with a same distinct guest using both the validated rules 238 and the matching rules 228 under test; a true negative occurs when a pair of the guest records 104 are determined not to be associated with a same distinct guest using both the validated rules 238 and the matching rules 228 under test; a false positive occurs when a pair of the guest records 104 are determined to be associated with a same distinct guest using the matching rules 228 under test, but the validated rules 238 indicate the pair are not associated with a same distinct guest; and a false negative occurs when a pair of the guest records 104 are determined not to be associated with a same distinct guest using the matching rules 228 under test, but the validated rules 238 indicate the pair are associated with a same distinct guest.

Figure 15:
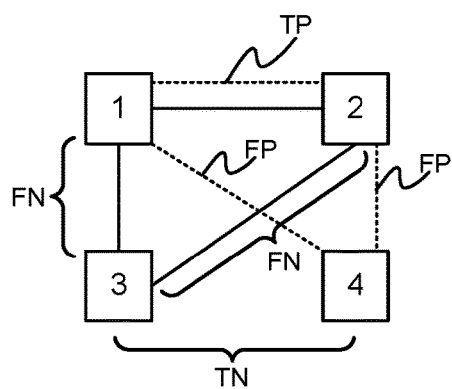
FIG. 15 depicts an example of another key performance indicators that may be used to validate matching rules, according to non-limiting examples.

Hence, with reference to FIG. 15, as the guest records "1" and "2" include both a solid line and a broken line therebetween, the relationship indicated by the broken line indicates a true positive (e.g. as both the guest records "1" and "2" are determined to be associated with a same distinct guest using both the validated rules 238 and the matching rules 228 under test); hence in FIG. 15, there is only one true positive. Similarly, FIG. 15 indicates two false positives (e.g. between the guest records "1" and "4", and between the guest records "2" and "4"), two false negatives (e.g. between the guest records "1" and "3", and between the guest records "2" and "3"), and one true negative (e.g. between the guest records "3" and "4").

Hence, respective numbers of true positives, true negatives, false positives and false negatives may be determined from the second subset of the guest records 104 and used to determine KPIs as next described.

For example, a "Precision" KPI can be determined from:

$$\text{Precision} = \frac{TP}{(TP + FP)} \quad \text{Equation (4)}$$

In Equation (4), "TP" comprises a number of true positives in the second subset of the method 1300, and "FP" comprises a number of false positives in the second subset of the method 1300. In general, the precision KPI measures a ratio of a number of true positives to the total number of positives (both true and false) in the second subset, and hence generally represents how accurate the matching rules 228 under test are in determining true positives. In general, the better the matching rules 228 under test are in determining true positives, the closer the precision KPI is to "1".

Similarly, a "Recall" KPI can be determined from:

$$\text{Recall} = \frac{TP}{(TP+FN)} \quad \text{Equation (5)}$$

In Equation (5), "TP" comprises a number of true positives in the second subset of the method 1300, and "FN" comprises a number of false negatives in the second subset of the method 1300. In general, the recall KPI measures a ratio of a number of true positives to the total of the number of true positives and false negatives in the second subset, and hence generally represents how accurate the matching rules 228 under test are in determining true positives as compared to false negatives. In general, the better the matching rules 228 under test are in determining true positives, the closer the recall KPI is to "1".

Hence, similar to as described above with respect to other KPIs, at the block 1310, the precision KPI and/or recall KPI may be compared to a respective threshold precision and/or threshold recall, and used to evaluate whether a "YES" or "NO" decision occurs at the block 1310 (e.g. the threshold precision and/or the threshold recall may be "0.95", and when the precision KPI and/or recall KPI is respectively above "0.95" a "YES" decision occurs at the block 1310, otherwise a "NO" decision occurs at the block 1310). However, any suitable threshold precision and/or threshold recall is within the scope of the present specification.

In some examples, an "Harmonic Mean" KPI may be determined from the precision and recall KPIs from:

$$\text{Harmonic Mean} = \frac{2*(\text{Precision}*\text{Recall})}{(\text{Precision} + \text{Recall})} \quad \text{Equation (6)}$$

In general, the better the matching rules 228 under test are in determining true positives, the closer the harmonic mean KPI is to "1".

Hence, similar to as described above with respect to other KPIs, at the block 1310, harmonic mean KPI may be compared to a threshold harmonic mean, and used to evaluate whether a "YES" or "NO" decision occurs at the block 1310 (e.g. the threshold harmonic mean may be "0.45", and when the harmonic mean KPI is above "0.45" a "YES" decision occurs at the block 1310, otherwise a "NO" decision occurs at the block 1310). However, any suitable threshold harmonic mean is within the scope of the present specification.

In any event the various KPIs described herein all show examples of various analyses that may be used to evaluate the one or more matching rules 228, and/or used as feedback at the block 1310 when evaluating and/or refining the one or more matching rules Heretofore, reference has been made to social graphs, social graph data, social graph identifiers, etc., which are next described in more detail.

Attention is now directed to FIG. 16 which depicts a flowchart representative of a method 1600 for altering a memory using activities identified by guest records and connected components thereof. The operations of the method 1600 of FIG. 16 correspond to machine readable instructions that may be executed by the server 101, and specifically the controller 220 of the server 101. However, the method 1600 may be implemented by any suitable server and/or computing device. In the illustrated example, the instructions represented by the blocks of FIG. 16 are stored at the memory 224 for example, as the application 227 (e.g. as a component and/or module thereof, and/or another application). The method 1600 of FIG. 16 is one way in which the controller 220 and/or the server 101 and/or the system 100 may be configured. Furthermore, the following discussion of the method 1600 of FIG. 16 will lead to a further understanding of the system 100, and its various components.

The method 1600 of FIG. 16 need not be performed in the exact sequence as shown and likewise various blocks may be performed in parallel rather than in sequence. Accordingly, the elements of method 1600 are referred to herein as "blocks" rather than "steps." The method 1600 of FIG. 16 may be implemented on variations of the system 100 of FIG. 1, as well.

At a block 1602, the controller 220 and/or the server 101 accesses the one or more memories 103 storing the guest records 104 identified by respective identifiers, as described above, similar to the block 302 of the method 300. However, when the method 1600 is implemented prior to the method 300, the respective identifiers of the block 1602 may comprise the identifiers 401; and/or when the method 1600 is implemented after to the method 300, the respective identifiers of the block 1602 may comprise the identifiers 603. Hence, the method 1600 may be implemented prior to, and/or after deduplication.

Furthermore, the guest records 104 are further understood to include activity identifiers identifying activities associated with the guest records 104, wherein two or more guest records 104 associated with a same activity have a same activity identifier. Examples of such activity identifiers are shown in FIG. 17, described below, and may comprise reservation identifiers.

For example, activities identified by the guest records 104 may include, but are not limited to, guests travelling together, referrals, booker-guest relationships, and/or any other social interaction that between guests and/or bookers of guests, that may be identified via the guest records 104. For example, two or more guest records 104 having a same reservation identifier may be understood to be associated with a same activity, and assigned a same activity identifier. Similarly, two or more guest records 104 having a same booker identifier (e.g. one guest may have booked travel for two guests which may or may not include the guest booking the travel) may be understood to be associated with a same activity, and assigned a same activity identifier. Similarly, two or more guest records 104 having a same referral identifier may be understood to be associated with a same activity, and assigned a same activity identifier.

Indeed, any suitable activity may be defined with respect to different identifier and/or data types of the guest records.

Furthermore, as the activities identified by the guest records 104 generally indicate social interactions between guests, and the like, associated with the guest record 104, such activities may alternatively be referred to as social activities and/or the activity identifiers may alternatively be referred to as social identifiers.

Furthermore, guest records 104 that are determined not to be associated with other guest records 104 via an activity may be assigned an activity identifier that is unique to a guest record 104 and/or not assigned to other guest records 104.

At a block 1606, the controller 220 and/or the server 101 generates a graph comprising connected components of the activity identifiers and respective identifiers, a connected component identified by an assigned identifier. Such a graph may alternatively be referred to as a social graph, and the assigned identifiers may alternatively be referred to as social graph identifiers. In particular, the social graph shows social connections between guests of the guest records 104, and the social graph identifiers identify such social connections.

Indeed, the block 1606 is generally similar to the block 306 of the method 300 but rather than basing the graph of the block 1606 on rule signatures and guest record identifiers, as in the block 306 of the method 300, the graph of the block 1606 is based activity identifiers and guest record identifiers (which may include, but are not limited to, profile identifiers).

As with the block 306 of the method 300, the graph of the block 1606 may be generated in one or more of a graphical format, a tabular format, a database format, and the like.

In some examples, the components of the graph may be filtered. For example, a first guest record 104 and a second guest record 104 may be associated with a first reservation, and the first guest record 104 may be associated with a second reservation that is also associated with a third guest record 104. However, the second guest record 104 may not otherwise be associated with the third guest record 104, yet when the graph is generated all three guest records 104 (or rather respective identifiers thereof) may be components of a same connected component. Hence, filtering may occur, for example, by limiting a size of a connected component using any suitable process and/or criteria. For example, the connected components may be limited by numbers of vertices, and the like, and/or when the vertices comprise reservation identifiers, and the like, the vertices may be required to include only given numbers of reservation identifiers and/or reservation identifiers that are common to given numbers of guests, for example to filter out reservation identifiers where only one guest provides an association therebetween. Alternatively, edges of a connected component may be required to be between vertices associated with at least two common guests; hence, in the above example, two connected components would result: a first connected component for the first and second guest records 104 and a second a connected component for the first and third guest records 104. However, any suitable criteria may be used to filter reservation identifiers including, but not limited to, criteria based on "degrees of separation" between guests, and/or criteria based on limiting a number of guests in a connected component to a given maximum number of guests. For example, with brief reference to FIG. 18, a connected component 1801-1 includes three guests (e.g. Bob, Alice and Doug) and a filter may be in place to limit a connected component to three guests and/or a maximum number of guests and/or using any suitable criteria.

In some examples, a guest record 104 may be assigned more than one assigned identifier (e.g. social graph identifier), and/or be associated with more than one connected component and/or be associated with more than one social graph, which may indicate a number of other guests known to a particular guest associated with such a guest record 104. However, a number of guest records 104 associated with a same assigned identifier (e.g. social graph identifier) may also provide such an indication.

At a block 1608, the controller 220 and/or the server 101 alters the one or more memories 103 to add the assigned identifiers to the guest records 104 to identify socially associated guest records 104. Hereafter, for clarity and to better distinguish from the assigned identifiers of the method 300, the assigned identifiers of the method 1600 will be referred to, interchangeably, as social graph identifiers.

Hence, for example, guests that travel together may be associated via the social graph identifiers, guests that make bookings for each other may be associated via the social graph identifiers, guests that make referrals for each other may be associated via the social graph identifiers, and the like.

Furthermore, the method 1600 may be implemented prior to the method 300 (e.g. before deduplication occurs) such that social graph identifiers may be used in the rule signatures 228 to assist with deduplication. Alternatively, the method 1600 may be implemented after the method 300 (e.g. after deduplication occurs).

For example, the social graph identifiers may be used (e.g. by the server 113) to generate messages to guest associated with guest records 104 having a same social graph identifiers (e.g. as such guests may know each other and such messages suggest common products and/or services to such guests).

In yet other examples, the social graph identifiers may be used (e.g. by the server 113) to analyze the guest records 104. For example, presently in "big data" computer analysis, tracking social interactions is a challenging and sometimes computationally intensive and/or inefficient process, and using the social graph identifiers in big data analysis, and the like, may result in processing resources being used more efficiently.

For example, the social graph identifiers may be used to estimate influence of a guest on other guests based on how many other guests one guest interacts with and/or knows, for example based on numbers of guest records 104 associated with a same social graph identifier and/or a number of social graph identifiers associated with a guest record In yet further examples, the social graph identifiers may be used in security applications to assist in verifying relationships between guests of the guest records 104. For example, when a guest associated with a first guest record 104 attempts to make a change to a travel reservation of guest associated with a second guest record 104, a common social graph identifier between the two guest records 104 may be used to verify that the guest know each other such that the guest of the first guest record 104 is then allowed to make the change. Put another way, the social graph identifiers may be used to establish a trust factor for some computer-based operations.

An example of the method 1600 is next described with respect to FIG. 17, FIG. 18 and FIG. 19.

In particular, FIG. 17 depicts a set of the guest records 104, and in particular travel reservations associated with reservation identifiers 1703, that have been deduplicated using the method 300 such that the guest records 104 are further associated with assigned identifiers 603, as described above. While the identifiers 401 are not depicted, the identifiers 401 may also be present, along with any other suitable identifier.

In the example of FIG. 17, the reservations identifiers 1703 may comprise the activity identifiers of the method 1600.

As depicted, two of the depicted guest records 104, identified by assigned identifiers 603 "AID1", "AID2", are associated with a reservation identifier "R1", another two of the depicted guest records 104, identified by assigned identifiers 603 "AID1", "AID3", are associated with a reservation identifier "R2", and one of the depicted guest records 104, identified by the assigned identifiers 603 "AID4", is associated with a reservation identifier "R3".

With attention next directed to FIG. 18, the guest records 104 may be accessed (e.g. at the block 1602 of the method 1600) by the server 101, and a graph 1800 of connected components 1801-1, 1801-2 may be generated (e.g. at the block 1606 of the method 1600). For example, as depicted the assigned identifiers 603 ("AID" in FIG. 18) and the reservation identifiers 1703 ("RES #" in FIG. 18) are used as vertices in the graph 1800, with assigned identifiers 603 and reservation identifiers 1703 of the same guest records 104 forming edges of the graph 1800.

As depicted, for example, the connected component 1801-1 comprises vertices "R1", "R2", "AID1", "AID2", AID3" with edges between: "R1" and "AID1" (e.g. as the first row of the guest records 104 of FIG. 17 includes "R1" and "AID1"); "R1" and "AID2" (e.g. as the second row of the guest records 104 of FIG. 17 includes "R1" and "AID2"); "R2" and "AID2" (e.g. as the third row of the guest records 104 of FIG. 17 includes "R2" and "AID2"); and "R2" and "AID3" (e.g. as the fourth row of the guest records 104 of FIG. 17 includes "R2" and "AID3").

Similarly, the connected component 1801-2 comprises vertices "R3", "AID3" with and edge therebetween (e.g. as the last row of the guest records 104 of FIG. 17 includes "R3" and "AID3").

Hence, there are two connected components 1801-1, 1801-2 of the graph 1800 and with a social graph identifier 1803-1, 1803-2 respectively assigned to the connected components 1801-1, 1801-2. As depicted, the social graph identifier 1803-1 comprises "SGID1", and the social graph identifier 1803-2 comprises "SGID2". The social graph identifiers 1803-1, 1803-2 are interchangeably referred to hereafter, collectively, as the social graph identifiers 1803 and, generically, as a social graph identifier 1803.

While only two connected components 1801-1, 1801-2 are depicted, the graph 1800 may comprise any suitable number of connected components based on the assigned identifiers 603 and the reservation identifiers 1703, and/or any other suitable identifiers of the guest records 104 (e.g. the identifiers 401) and and/or any other suitable activity identifiers.

Attention is next directed to FIG. 19 which depicts an example of the block 1608 of the method 1600. In particular, the server 101 has altered the memory 103 to add the social graph identifiers 1803 to the guest records 104 (e.g. of FIG. 17) to identify socially associated guest records 104.

For example, as depicted in FIG. 19, the guest records 104 of FIG. 17 have been altered to include a column which for storing social graph identifiers 1803, and all the guest records 104 (e.g. four guest records 104) having a vertex and/or edge in the connected components 1801-1 are identified via the social graph identifier 1803-1 and, similarly, all the guest records 104 (e.g. one guest records 104) having a vertex and/or edge in the connected components 1801-2 are identified via the social graph identifier 1803-2.

Furthermore, the social graph identifiers described herein may be used to identify most frequent travel companion of a guest of the guest records 104, which when identified prior to deduplication, may be used for deduplication.

In some examples, "travel habits" of guest associated with the guest records 104 may be identified and used for deduplication and/or any other suitable process. For example, a "travel habit" may include, but is not limited to, a most visited destination for a guest, a most used service for a guest, and the like, which may be used for deduplication and/or any other suitable process.

Attention is next directed to FIG. 20 which depicts which a flowchart representative of a method 2000 for altering a memory to identify most frequent habits of guest records. The operations of the method 2000 of FIG. 20 correspond to machine readable instructions that may be executed by the server 101, and specifically the controller 220 of the server 101. However, the method 2000 may be implemented by any suitable server and/or computing device. In the illustrated example, the instructions represented by the blocks of FIG. 20 are stored at the memory 224 for example, as the application 227 (e.g. as a component and/or module thereof, and/or another application). The method 2000 of FIG. 20 is one way in which the controller 220 and/or the server 101 and/or the system 100 may be configured. Furthermore, the following discussion of the method 2000 of FIG. 20 will lead to a further understanding of the system 100, and its various components.

The method 2000 of FIG. 20 need not be performed in the exact sequence as shown and likewise various blocks may be performed in parallel rather than in sequence. Accordingly, the elements of method 2000 are referred to herein as "blocks" rather than "steps." The method 2000 of FIG. 20 may be implemented on variations of the system 100 of FIG. 1, as well.

At a block 2002, the controller 220 and/or the server 101 accesses the one or more memories 103 storing the guest records 104 identified by respective identifiers, as described above, similar to the block 302 of the method 300. However, when the method 2000 is implemented prior to the method 300, the respective identifiers of the block 2002 may comprise the identifiers 401; and/or when the method 2000 is implemented after to the method 300, the respective identifiers of the block 2002 may comprise the identifiers 603. Hence, the method 2000 may be implemented prior to, and/or after deduplication.

Furthermore, the guest records 104 are further understood to include habit identifiers identifying one or more habits and/or travel habits of associated guests.

For example, habits identified by the habit identifiers may include, but are not limited to: destinations visited by guests (e.g. as represented by airline reservations, hotel reservations, and the like), services purchased by the guests (e.g. as represented by meal reservations, spa reservations, gym reservations, sporting event reservations (e.g. golf tee off times), and the like). However, any suitable habits which may be associated with travel, and which may be identified in the guest records, are within the scope of the present specification.

An example of guest records that include habit identifiers are depicted in FIG. 21. However, for example, habit identifiers of the guest records may generally indicate respective number of times an associated guest has travelled to a given destination, and/or had a particular meal, and/or visited a gym, and/or visited a spa, and/or played a sport, and the like.

At a block 2004, the controller 220 and/or the server 101 identifies most frequent habits based on the habit identifiers. For example, a most frequent habit may comprise a habit having the largest number of times that a guest has performed the habit. In a particular example, a most frequent habit may include, but is not limited to, a most visited destination for the guest, a most frequently used service of a guest, a most frequent meal of a guest, a most frequent activity of a guest (e.g. visited a gym, or spa or played a sport) and the like.

In some examples, the habit identifiers may be filtered based on number of times that a guest has performed an associated habit, as described in more detail below.

At a block 2008, the controller 220 and/or the server 101 alters the one or more memories 103 to add most frequent habit identifiers to the guest records 104 to identify the most frequent habits.

An example of the method 2000 is next described with respect to FIG. 21, FIG. 22, FIG. 23, FIG. 24 and FIG. 25.

With attention next directed to FIG. 21, example guest records 2104 are depicted which may be the same or different from the guest records 104. In particular, each guest record 2104 (again depicted in a tabular format, with a guest record per row of the table), includes a reservation identifier "RES #", a profile identifier "Profile #", a name and email address of an associated guest, and columns of habit identifiers 2105 indicating meal reservations, gym reservations, spa reservations, and golf reservations associated with a given guest record 2104 (e.g. and/or reservation identifier). For example, as depicted, the guest records 2104 may represent hotel reservations and meals, gym visits, spa visits, and golf tee-offs associated with a hotel reservation (e.g. for a reservation identifier "RES #") for given guests (e.g. represented by a profile identifier "Profile #").

For example, a habit identifier 2105 "Y" in a habit identifier column indicates that a reservation for an associated habit (e.g. such as breakfast) was made in association with a hotel reservation, while a habit identifier 2105 "N" in a habit identifier column indicates that a reservation for an associated habit was not made in association with a hotel reservation. However, any suitable habit identifiers may be used to indicate that a given habit is associated with a given reservation and/or a given profile. For example, "1" may be used in place of "Y" and "0" may be used in place of "N".

Alternatively, a guest record 2104 may indicate a given textual or graphical habit identifier with a reservation identifier, that specifically identifies a particular habit associated with the reservation identifier (e.g. a textual habit identifier "Breakfast" may be associated with a reservation identifier when a breakfast reservation is associated therewith). Similarly, an absence of given textual or graphical habit identifier with a reservation identifier, that specifically identifies a particular habit may indicate that the particular habit is not associated with the reservation identifier (e.g. a textual habit identifier "Lunch" may be not associated with a reservation identifier when no lunch reservation is associated therewith).

As depicted, breakfast reservations were made for the guest records 2104 associated with reservation identifiers "R1" and "R2, and profile identifiers "P1" and "P2"; no lunch or dinner reservations were made; gym reservations were made for the guest records 2104 associated with reservation identifiers "R2", "R3", "R6" and "R7", and profile identifiers "P2" and "P4"; a spa reservation was made for the guest record 2104 associated with reservation identifier "R5" and profile identifier "P4"; and a golf reservation was made for the guest record 2104 associated with reservation identifier "R4" and profile identifier "P3".

Attention is next directed to FIG. 22 which depicts the server 101 accessing (e.g. at the block 2002 of the method 2000) the guest records 2104 and beginning implementation of identifying most frequent habits based on the habit identifier 2105 (e.g. at the block 2004 of the method 2000). In the depicted example, the server 101 determines how many times a given habit is associated with a given profile, for example by sorting and/or counting the profile identifiers by associated habit identifiers 2105 "Y" of a given habit of associated guest records 2104. In the depicted example, the results of such sorting are provided in a table 2200.

For example, as depicted (and as also seen in FIG. 21), the profile identifier "P1" is associated with one breakfast reservation (e.g. breakfast habit) and one spa reservation (e.g. spa habit). Similarly, the profile identifier "P2" is associated with one breakfast reservation and two gym reservations (e.g. gym habit). Similarly, the profile identifier "P3" is associated with one golf reservation (e.g. golf habit). Similarly, the profile identifier "P4" is associated with one spa reservation and two gym reservations. In FIG. 22, a particular habit identifier comprises a textual representation of the habit. For example, in FIG. 22, for clarity and conciseness, rather than using "Y" and "N", habit identifiers "Breakfast", "Spa", "Gym" and "Golf" are used.

Also depicted in FIG. 22 is a total number of habit identifiers associated with particular profile identifiers, as provided in a column "Total". For example (and as also seen in FIG. 21), the profile identifier "P1" is associated with two habit identifiers, "Breakfast" and "Spa", and hence each instance of the profile identifier "P1" has "2" in the "Total" column.

Similarly, the profile identifier "P2" is associated with three habit identifiers, "Breakfast" and two instances of "Gym", and hence each instance of the profile identifier "P2" has "3" in the "Total" column. Similarly, the profile identifier "P3" is associated with one habit identifier "Golf" and hence the instance of the profile identifier "P3" has "1" in the "Total" column. Similarly, the profile identifier "P4" is associated with three habit identifiers, "Spa" and two instances of "Gym", and hence each instance of the profile identifier "P4" has "3" in the "Total" column.

It is further understood that the table 2200 represents an intermediate step of the block 2004 of the method 2000 and is shown for clarity, and may not be generated by the server 101.

Attention is next directed to FIG. 23 in which the server 101 applies a threshold to the table 2200, specifically a minimum number of occurrences threshold which, as depicted has been set to "2", however any suitable threshold is within the scope of the present specification. The minimum number of occurrences threshold comprises a minimum number of total times that a habit is to be associated with a profile identifier to be considered a possible most frequent habit. Put another way, when a habit has been performed below the minimum number of total times, it is understood that there may not be enough data to consider it a habit.

Hence, for example, the server 101 may filter the table 2200 to generate the table 2300 which has rows with totals of less than "2" removed therefrom, as compared to the table 2200. As depicted, the row for profile identifier "P3" has been removed as the associated total for this profile identifier in the table 2200 was "1".

It is further understood that the table 2300 represents an intermediate step of the block 2004 of the method 2000 and is shown for clarity, and may not be generated by the server 101.

Attention is next directed to FIG. 24 which depicts a table 2401 that may be generated from the table 2300. In particular, the server 101 counts a number of habit identifiers for each profile identifier in the table 2300, and reduces the table 2300 to one habit identifier for each type for each profile along with a count (e.g. in a column "Count") of the habit identifiers for each type. Hence, for example, as the profile identifier "P2" is associated with two instances of the habit identifier "Breakfast", one of the "Breakfast" rows is removed in the table 2401, relative to the table 2300, and a count "2" for "Breakfast" is placed in the column "Count".

Furthermore, a ratio of a count to the total is generated (e.g. in a column "Ratio") for each habit identifier and for each profile identifier. Hence, for example, as the profile identifier "P1" is associated with a total of "2" habit identifiers, "1" for "Breakfast" and "1" for "Spa", the ratio for each is "1/2". Similarly, as the profile identifier "P2" is associated with a total of "3" habit identifiers, "1" for "Breakfast" and "2" for "Gym", the ratio for "Breakfast" is "1/3" and the ratio for "Gym" is "2/3". Similarly, as the profile identifier "P4" is associated with a total of "3" habit identifiers, "1" for "Spa" and "2" for "Gym", the ratio for "Spa" is "1/3" and the ratio for "Gym" is "2/3".

As also depicted in FIG. 24, the server 101 applies a threshold to the table 2401 to generate a table 2402, specifically a minimum ratio threshold which, as depicted has been set to "0.6", however any suitable minimum ratio threshold is within the scope of the present specification. The minimum ratio threshold comprises a minimum ratio above which a habit associated with a profile identifier is to be considered a most frequent habit. Put another way, when a habit is associated with a ratio below a "minimum ratio threshold", such a habit may be considered "weak".

Hence, for example, habit identifiers in the table 2401, with ratios below 0.6, are discarded to generate the table 2402. In particular, the ratios "1/2" and "1/3", along with associated habit identifiers and profile identifiers, are discarded, leaving the ratio "2/3" along with associated habit identifiers and profile identifiers. Hence, after the filtering, in the table 2402, two profile identifiers "P2" and "P4" remain with associated habit identifiers "Gym".

Hence, the habit "Gym" has been determined to be the most frequent habit for the guest records 2104 associated with the profile identifiers "P2" and "P4".

As a most frequent habit has not been determined for the guest records 2104 associated with the profile identifiers "P1" and "P3", for example due to the filtering using the minimum number of occurrences threshold and the minimum ratio threshold, a most frequent habit for the guest records 2104 associated with the profile identifiers "P1" and "P3" may be set to "NULL", as also depicted in the table 2402.

Indeed, in the example of the block 2004 of the method 2000 shown by FIG. 22, FIG. 23 and FIG. 24, there is an underlying assumption that in order for a habit to be identified as a most frequent habit, a habit must meet the criteria of the minimum number of occurrences threshold and the minimum ratio threshold, such that there is "enough" evidence and/or data to justify a habit to be identified as a most frequent habit.

However, any suitable criteria may be used to identify a habit as a most frequent habit. For example, in a simple model, the habit having a most number of occurrences in reservations associated with a profile identifier (and/or guest records 2104 associated therewith) may be identified as a most frequent habit (e.g. even when there is only one occurrence of one habit type, such as "Breakfast", and no occurrences of other habit types for a profile identifier (and/or guest records 2104 associated therewith)).

Furthermore, when two or more habits are "tied" for being identified as being most frequent habit (e.g. due to a same count and/or a same ratio), any suitable scheme and/or weighting scheme and/or hierarchical scheme may be used to resolve the tie. For example, "Breakfast" may be weighted and/or ranked higher than "Golf"; hence when there is a tie between "Breakfast" and "Golf", "Breakfast" may be identified as the most frequent habit.

Furthermore, while not depicted, in some examples, yet a further intermediate step may occur between generating the tables 2401, 2402: keeping a highest valued habit, with respect to the ratio, per each profile identifier; in this example, "Gym" may be kept for each of the profile identifiers "P2" and "P3" (e.g. as each of a ratio of "2/3" while the other habit identifier for each of the profile identifiers "P2" and "P3" has a ratio of "1/3"). However, as there is a tie between "Breakfast" and "Spa" for the profile identifier "P1" (e.g. as each have ratios of "1/2"), a scheme for keeping one of "Breakfast" and "Spa" may be used; for example, the various habits described herein may be weighted and/or ranked differently, as described above.

The table 2402 represents an example outcome of the block 2004 of the method 2000. However, it is further understood that the table 2401 represents an intermediate step of the block 2004 of the method 2000 and is shown for clarity, and may not be generated by the server 101; similarly, while the table 2402 represents an example outcome of the block 2004, such a table may not actually be generated; rather the outcome of the block 2004 of the method 2000 may be provided in any suitable manner.

Attention is next directed to FIG. 25 which depicts an example of the block 2008 of the method 2000. In particular, the server 101 has altered the memory 103 to add the most frequent travel habit to the guest records 2104.

For example, as depicted in FIG. 25, the guest records 2104 of FIG. 21 have been altered to include a column which for storing most frequent travel habit identifiers.

Furthermore, while the example of the method 2000 provided in FIG. 21, FIG. 22, FIG. 23, FIG. 24 and FIG. 25 has been described with respect to meals and services for which a guest has made a reservation, in other examples the method 2000 may be used to determine a most visited destination for a guest, for example based on numbers of flights (and the like) to destinations and/or bookings to and/or at the destinations.

The example of the method 2000 provided in FIG. 21, FIG. 22, FIG. 23, FIG. 24 and FIG. 25 may be summarized as follows:

1. Determine find how many times a guest associated with a given profile has used/reserved a service/travelled to any destination.

2. When a value (e.g. of the times a guest associated with a given profile has used/reserved a service/travelled to a destination) is below a "min occurrences threshold", discard the value as there may not be enough data to consider the associated service/destination a "habit".

3. Determine a ratio of how many times a profile has used a specific service/travelled to a specific destination over how many times a profile has used any service/travelled to any destination.

4. (Optionally) Keep the highest valued habit (e.g. with respect to ratio) per each profile.

5. When a ratio value is below the minimum ratio threshold, the associated habit is discarded as it may be designated as a "weak" habit.

6. Identify the remaining habit as the most frequent habit and associate with the corresponding profiles in guest records.

7. For profiles where no most frequent habit has been identified, set a most frequent habit as "NULL".

The most frequent habits may be used in "big data" analysis, similar to the social graph identifiers as described above (e.g. for market study and/or market segmentation).

Similarly, the most frequent habits may be used to more efficiently provide messages to guests of the guest records 2104 so as to use processing resources (e.g. at the server 113) more efficiently (e.g. to provide better targeted product suggestions and/or recommendations). For example, when a guest often reserves golf tee-off times, messages to the guest for golf-related products and/or services may be provided; similarly, when a guest most often travels to Paris, messages to the guest offering flight and/or hotel services for Paris may be provided.

Furthermore, the method 2000 may be implemented prior to the method 300 (e.g. before deduplication occurs) such that most frequent habits may be used in the rule signatures 228 to assist with deduplication. Alternatively, the method 2000 may be implemented after the method 300 (e.g. after deduplication occurs).

In this specification, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this specification, language of "at least one of X, Y, and Z" and "one or more of X, Y and Z" can be construed as X only, Y only, Z only, or any combination of two or more items X, Y, and Z (e.g., XYZ, XY, YZ, XZ, and the like). Similar logic can be applied for two or more items in any occurrence of "at least one . . . " and "one or more . . . " language.

The terms "about", "substantially", "essentially", "approximately", and the like, are defined as being "close to", for example as understood by persons of skill in the art. In some examples, the terms are understood to be "within 10%," in other examples, "within 5%", in yet further examples, "within 1%", and in yet further examples "within 0.5%".

Persons skilled in the art will appreciate that in some examples, the functionality of devices and/or methods and/or processes described herein can be implemented using pre-programmed hardware or firmware elements (e.g., application specific integrated circuits (ASICs), electrically erasable programmable read-only memories (EEPROMs), etc.), or other related components. In other examples, the functionality of the devices and/or methods and/or processes described herein can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Furthermore, it is appreciated that the computer-readable program can be stored as a computer program product comprising a computer usable medium. Further, a persistent storage device can comprise the computer readable program code. It is yet further appreciated that the computer-readable program code and/or computer usable medium can comprise a non-transitory computer-readable program code and/or non-transitory computer usable medium. Alternatively, the computer-readable program code could be stored remotely but transmittable to these components via a modem or other interface device connected to a network (including, without limitation, the Internet) over a transmission medium. The transmission medium can be either a non-mobile medium (e.g., optical and/or digital and/or analog communications lines) or a mobile medium (e.g., microwave, infrared, free-space optical or other transmission schemes) or a combination thereof.

Persons skilled in the art will appreciate that there are yet more alternative examples and modifications possible, and that the above examples are only illustrations of one or more examples. The scope, therefore, is only to be limited by the claims appended hereto.

What is claimed is:

1. A method comprising:

accessing, at one or more servers, one or more memories storing guest records identified by respective identifiers;

generating, at the one or more servers, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule;

generating, at the one or more servers, a graph comprising connected components of the plurality of rule signatures and respective identifiers, a connected component corresponding to a distinct guest of the guest records, and the connected component identified by an assigned identifier, wherein at the graph, vertices of a given connected component comprises respective guest record identifiers and associated rule signatures, and wherein when two vertices of the connected component corresponds to two respective identifiers of two guest records, the two guest records comprise duplicate guest records and correspond to the distinct guest;

altering, via the one or more servers, the one or more memories to add assigned identifiers to the guest records that are identified by the respective identifiers associated with one or more respective rule signatures of the connected components such that the duplicate guest records are associated with a common assigned identifier; and one or more of:

merging the duplicate guest records at the one or more memories into a single guest record such that such that the one or more memories stores one guest record for the distinct guest, the one guest record associated with the common assigned identifier:

when the duplicate guest records are associated with two or more different network addresses, transmitting one message to only one network address of the two or more different network addresses associated with the duplicate guest records; and adding respective links to the duplicate guest records; receiving an actuation of a respective link added to a first duplicate guest record, the respective link associated with a second duplicate guest record; and, in response to receiving the actuation of the respective link: retrieving the second duplicate guest record from the one or more memories; and rendering the second duplicate guest record at a display screen.

2. The method of claim 1, wherein a matching rule, used to generate one or more of the plurality of rule signatures, comprises information for generating a concatenated string of values from the guest records from one or more of:

a name of a guest;
an identifier of the guest;
a personal identifier of the guest;
an address of the guest;
a company of the guest;
payment information associated with the guest;
credit card information associated with the guest;
a language preference of the guest;
a birthday of the guest;
a most used product of the guest;
a most frequent travel companion of the guest
a reservation channel of the guest;
a gender of the guest;
a name prefix of the guest;
a name suffix of the guest;
a string transformation associated with the guest;
an online identifier of the guest;
a loyalty identifier of the guest;
a network identifier of the guest;
an email address of the guest;
a telephone number of the guest;
a most visited destination for the guest;
a social graph identifier for the guest; and
a reservation identifier for the guest.

3. The method of claim 1, wherein edges of the given connected component comprises lines between the respective guest record identifiers and the associated rule signatures.

4. The method of claim 1, further comprising:
identifying respective guest records associated with abnormal content as defined by one or more abnormality definitions; and
removing the respective guest records associated with the abnormal content from one or more of generating the rule signatures and generating the graph.

5. The method of claim 1, further comprising:
identifying respective guest records associated with a number of travel reservations that is above a given threshold number of the travel reservations; and, one or more of:
excluding the respective guest records from the generating the plurality of rule signatures; and excluding the respective guest records from the generating the graph.

6. The method of claim 1, further comprising:
validating a number of distinct guests determined from the connected components based on a ground truth number of the distinct guests.

7. The method of claim 1, further comprising:
determining, via the one or more servers, groups of the guest records that are identified by common assigned identifiers.

8. A server comprising:
one or more memories storing guest records identified by respective identifiers; and
a controller having access to the one or more memories, the controller configured to:
generate, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule;
generate a graph comprising connected components of the plurality of rule signatures and respective identifiers, a connected component corresponding to a distinct guest of the guest records, and the connected component identified by an assigned identifier, wherein at the graph, vertices of a given connected component comprises respective guest record identifiers and associated rule signatures, and wherein when two vertices of the connected component corresponds to two respective identifiers of two guest records, the two guest records comprise duplicate guest records and correspond to the distinct guest;
alter the one or more memories to add assigned identifiers to the guest records that are identified by the respective identifiers associated with one or more respective rule signatures of the connected components such that the duplicate guest records are associated with a common assigned identifier; and
one or more of:
merge the duplicate guest records at the one or more memories into a single guest record such that such that the one or more memories stores one guest record for the distinct guest, the one guest record associated with the common assigned identifier;
when the duplicate guest records are associated with two or more different network addresses, transmit one message to only one network address of the two or more different network addresses associated with the duplicate guest records; and
add respective links to the duplicate guest records; receive an actuation of a respective link added to a first duplicate guest record, the respective link associated with a second duplicate guest record; and, in response to receiving the actuation of the respective link: retrieve the second duplicate guest record from the one or more memories; and render the second duplicate guest record at a display screen.

9. The server of claim 8, wherein a matching rule, used to generate one or more of the plurality of rule signatures, comprises information for generating a concatenated string of values from the guest records from one or more of:
a name of a guest;
an identifier of the guest;
a personal identifier of the guest;
an address of the guest;
a company of the guest;
payment information associated with the guest;
credit card information associated with the guest;
a language preference of the guest;
a birthday of the guest;
a most used product of the guest;
a most frequent travel companion of the guest
a reservation channel of the guest;
a gender of the guest;
a name prefix of the guest;
a name suffix of the guest;
a string transformation associated with the guest;
an online identifier of the guest;
a loyalty identifier of the guest;
a network identifier of the guest;
an email address of the guest;
a telephone number of the guest;
a most visited destination for the guest;
a social graph identifier for the guest; and
a reservation identifier for the guest.

10. The server of claim 8, wherein edges of the given connected component comprises lines between the respective guest record identifiers and the associated rule signatures.

11. The server of claim 8, wherein the controller is further configured to:

identify respective guest records associated with abnormal content as defined by one or more abnormality definitions; and remove the respective guest records associated with the abnormal content from one or more of generating the rule signatures and generating the graph.

12. The server of claim 8, wherein the controller is further configured to:

identify respective guest records associated with a number of travel reservations that is above a given threshold number of the travel reservations; and, one or more of:

exclude the respective guest records from generating the plurality of rule signatures; and exclude the respective guest records from generating the graph.

13. The server of claim 8, wherein the controller is further configured to:

validate a number of distinct guests determined from the connected components based on a ground truth number of the distinct guests.

14. The server of claim 8, wherein the controller is further configured to:

determine groups of the guest records that are identified by common assigned identifiers.

15. A non-transitory computer-readable medium storing a computer program, wherein execution of the computer program is for:

accessing, at one or more servers, one or more memories storing guest records identified by respective identifiers;

generating, at the one or more servers, using one or more matching rules, a plurality of rule signatures from the guest records, a rule signature associated with a respective identifier of a guest record from which the rule signature was generated, the rule signature comprising a string of values from the guest record that are substituted for corresponding information defined by an associated matching rule;

generating, at the one or more servers, a graph comprising connected components of the plurality of rule signatures and respective identifiers, a connected component corresponding to a distinct guest of the guest records, and the connected component identified by an assigned identifier, wherein at the graph, vertices of a given connected component comprises respective guest record identifiers and associated rule signatures, and wherein when two vertices of the connected component corresponds to two respective identifiers of two guest records, the two guest records comprise duplicate guest records and correspond to the distinct guest;

altering, via the one or more servers, the one or more memories to add assigned identifiers to the guest records that are identified by the respective identifiers associated with one or more respective rule signatures of the connected components such that the duplicate guest records are associated with a common assigned identifier; and one or more of:

merging the duplicate guest records at the one or more memories into a single guest record such that such that the one or more memories stores one guest record for the distinct guest, the one guest record associated with the common assigned identifier;

when the duplicate guest records are associated with two or more different network addresses, transmitting one message to only one network address of the two or more different network addresses associated with the duplicate guest records; and adding respective links to the duplicate guest records;

receiving an actuation of a respective link added to a first duplicate guest record, the respective link associated with a second duplicate guest record; and, in response to receiving the actuation of the respective link: retrieving the second duplicate guest record from the one or more memories; and rendering the second duplicate guest record at a display screen.

16. The non-transitory computer-readable medium of claim 15, wherein a matching rule, used to generate one or more of the plurality of rule signatures, comprises information for generating a concatenated string of values from the guest records from one or more of:

a name of a guest;
an identifier of the guest;
a personal identifier of the guest;
an address of the guest;
a company of the guest;
payment information associated with the guest;
credit card information associated with the guest;
a language preference of the guest;
a birthday of the guest;
a most used product of the guest;
a most frequent travel companion of the guest
a reservation channel of the guest;
a gender of the guest;
a name prefix of the guest;
a name suffix of the guest;
a string transformation associated with the guest;
an online identifier of the guest;
a loyalty identifier of the guest;
a network identifier of the guest;
an email address of the guest;
a telephone number of the guest;
a most visited destination for the guest;
a social graph identifier for the guest; and
a reservation identifier for the guest.

17. The non-transitory computer-readable medium of claim 15, wherein edges of the given connected component comprises lines between the respective guest record identifiers and the associated rule signatures.

18. The non-transitory computer-readable medium of claim 15, wherein execution of the computer program is further for:

identifying respective guest records associated with abnormal content as defined by one or more abnormality definitions; and removing the respective guest records associated with the abnormal content from one or more of generating the rule signatures and generating the graph.

19. The non-transitory computer-readable medium of claim 15, wherein execution of the computer program is further for:

identifying respective guest records associated with a number of travel reservations that is above a given threshold number of the travel reservations; and, one or more of:

excluding the respective guest records from the generating the plurality of rule signatures; and excluding the respective guest records from the generating the graph.

20. The non-transitory computer-readable medium of claim 15, wherein execution of the computer program is further for:

validating a number of distinct guests determined from the connected components based on a ground truth number of the distinct guests.

* * * * *